(12) United States Patent
Bhowmick et al.

(10) Patent No.: US 12,260,331 B2
(45) Date of Patent: *Mar. 25, 2025

(54) DISTRIBUTED LABELING FOR SUPERVISED LEARNING

(71) Applicant: Apple Inc., Cupertino, CA (US)

(72) Inventors: Abhishek Bhowmick, Santa Clara, CA (US); Ryan M. Rogers, Sunnyvale, CA (US); Umesh S. Vaishampayan, Santa Clara, CA (US); Andrew H. Vyrros, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,656

(22) Filed: Jul. 24, 2023

(65) Prior Publication Data

US 2024/0028890 A1 Jan. 25, 2024

Related U.S. Application Data

(63) Continuation of application No. 16/556,066, filed on Aug. 29, 2019, now Pat. No. 11,710,035.

(Continued)

(51) Int. Cl.
*G06N 3/08* (2023.01)
*G06N 3/04* (2023.01)
(Continued)

(52) U.S. Cl.
CPC ............. *G06N 3/08* (2013.01); *G06N 3/04* (2013.01); *G06N 3/044* (2023.01); *G06N 3/045* (2023.01); *G06N 3/10* (2013.01)

(58) Field of Classification Search
CPC .. G06F 16/906; G06F 18/2115; G06F 18/217; G06F 40/284; G06F 8/25;
(Continued)

(56) References Cited

U.S. PATENT DOCUMENTS

| | | | | |
|---|---|---|---|---|
| 4,829,577 A | * | 5/1989 | Kuroda | G10L 15/144 704/E15.029 |
| 8,417,648 B2 | * | 4/2013 | Hido | G06N 20/00 706/20 |

(Continued)

FOREIGN PATENT DOCUMENTS

| | | |
|---|---|---|
| CN | 105868773 A | 8/2016 |
| CN | 106295697 | 1/2017 |

(Continued)

OTHER PUBLICATIONS

Beaulieu-Jones, "Machine Learning Methods to Identify Hidden Phenotypes in the Electronic Health Record," Dissertation, University of Pennsylvania, 2017, 178 pages.

(Continued)

*Primary Examiner* — Gerald Gauthier
(74) *Attorney, Agent, or Firm* — BAKERHOSTETLER

(57) ABSTRACT

Embodiments described herein provide a technique to crowdsource labeling of training data for a machine learning model while maintaining the privacy of the data provided by crowdsourcing participants. Client devices can be used to generate proposed labels for a unit of data to be used in a training dataset. One or more privacy mechanisms are used to protect user data when transmitting the data to a server. The server can aggregate the proposed labels and use the most frequently proposed labels for an element as the label for the element when generating training data for the machine learning model. The machine learning model is then trained using the crowdsourced labels to improve the accuracy of the model.

20 Claims, 19 Drawing Sheets

Related U.S. Application Data

(60) Provisional application No. 62/738,990, filed on Sep. 28, 2018.

(51) Int. Cl.
  *G06N 3/044* (2023.01)
  *G06N 3/045* (2023.01)
  *G06N 3/10* (2006.01)

(58) Field of Classification Search
  CPC ....... G06F 16/2455; G06F 16/35; G06N 3/04;
  G06N 3/044; G06N 3/045; G06N 3/08;
  G06N 3/10; G06N 20/00; G06N 3/047;
  G06V 10/454; H04L 63/105; H04L
  63/1433; H04W 12/02; G10L 15/144;
  G16B 20/20
  See application file for complete search history.

(56) References Cited

U.S. PATENT DOCUMENTS

| | | | |
|---|---|---|---|
| 9,275,347 B1 | 3/2016 | Harada | |
| 9,355,359 B2 | 5/2016 | Welinder | |
| 9,594,741 B1 | 3/2017 | Thakurta et al. | |
| 9,792,562 B1 | 10/2017 | Chen et al. | |
| 10,063,582 B1* | 8/2018 | Feng | H04L 63/1433 |
| 10,275,690 B2 | 4/2019 | Chen | |
| 10,540,578 B2 | 1/2020 | Madani | |
| 10,554,738 B1 | 2/2020 | Ren | |
| 10,726,356 B1 | 7/2020 | Zarandioon | |
| 10,979,461 B1* | 4/2021 | Cervantez | H04L 63/105 |
| 11,093,818 B2 | 8/2021 | Li | |
| 11,120,337 B2 | 9/2021 | Wu | |
| 11,194,846 B2 | 12/2021 | Stenneth | |
| 11,321,629 B1* | 5/2022 | Rowan | G06N 20/00 |
| 11,354,578 B2* | 6/2022 | Baker | G06N 3/044 |
| 11,379,695 B2* | 7/2022 | Desai | G06V 10/454 |
| 11,710,035 B2* | 7/2023 | Bhowmick | G06N 3/08 706/10 |
| 11,755,915 B2* | 9/2023 | Fenchel | G06F 16/35 706/10 |
| 12,014,426 B2* | 6/2024 | Myers | G06N 20/00 |
| 2002/0007334 A1 | 1/2002 | Dicks | |
| 2012/0203716 A1* | 8/2012 | Baker | G06F 18/217 706/10 |
| 2013/0066818 A1 | 3/2013 | Assadollahi et al. | |
| 2013/0346356 A1 | 12/2013 | Welinder | |
| 2014/0115715 A1 | 4/2014 | Pasdar | |
| 2014/0279716 A1 | 9/2014 | Cormack | |
| 2015/0178596 A1 | 6/2015 | Bengio | |
| 2015/0213360 A1 | 7/2015 | Venanzi | |
| 2015/0254573 A1 | 9/2015 | Abu-Mostafa et al. | |
| 2015/0356459 A1 | 12/2015 | Ghosh | |
| 2016/0247501 A1 | 8/2016 | Kim | |
| 2016/0277215 A1 | 9/2016 | Zhou | |
| 2016/0277435 A1 | 9/2016 | Salajegheh et al. | |
| 2017/0011306 A1 | 1/2017 | Kim | |
| 2017/0116519 A1 | 4/2017 | Johnson | |
| 2017/0220949 A1 | 8/2017 | Feng et al. | |
| 2017/0270244 A1* | 9/2017 | Murugesan | G16B 20/20 |
| 2017/0277906 A1 | 9/2017 | Camenisch et al. | |
| 2017/0316348 A1* | 11/2017 | Ghosh | G06F 16/906 |
| 2017/0353855 A1* | 12/2017 | Joy | H04W 12/02 |
| 2017/0353865 A1 | 12/2017 | Li | |
| 2017/0364810 A1 | 12/2017 | Gusev | |
| 2018/0018590 A1 | 1/2018 | Szeto | |
| 2018/0053071 A1 | 2/2018 | Chen | |
| 2018/0101697 A1 | 4/2018 | Rane | |
| 2018/0114101 A1 | 4/2018 | Desai | |
| 2018/0114334 A1 | 4/2018 | Desai | |
| 2018/0137433 A1 | 5/2018 | Devarakonda | |
| 2018/0336486 A1 | 11/2018 | Chu | |
| 2018/0349620 A1 | 12/2018 | Bhowmick | |
| 2018/0357292 A1* | 12/2018 | Rai | G06F 16/2455 |
| 2018/0357556 A1* | 12/2018 | Rai | G06N 20/00 |
| 2018/0357595 A1* | 12/2018 | Rai | G06Q 10/087 |
| 2019/0050713 A1 | 2/2019 | Nirihira | |
| 2019/0196795 A1* | 6/2019 | Cavalier | G06F 8/35 |
| 2019/0227980 A1 | 7/2019 | McMahan | |
| 2019/0244138 A1* | 8/2019 | Bhowmick | G06N 3/045 |
| 2019/0279085 A1* | 9/2019 | Umeda | G06N 3/08 |
| 2019/0311298 A1 | 10/2019 | Kopp | |
| 2019/0318261 A1* | 10/2019 | Deng | G06N 20/00 |
| 2019/0354810 A1* | 11/2019 | Samel | G06F 18/2115 |
| 2019/0370334 A1 | 12/2019 | Bhowmick | |
| 2020/0043467 A1* | 2/2020 | Qian | G06N 3/044 |
| 2020/0065706 A1 | 2/2020 | Kao | |
| 2020/0104705 A1* | 4/2020 | Bhowmick | G06N 3/044 |
| 2020/0334979 A1 | 10/2020 | Goncalves | |
| 2020/0410134 A1 | 12/2020 | Bhowmick | |
| 2022/0129641 A1* | 4/2022 | Jezewski | G06F 40/284 |
| 2024/0028890 A1* | 1/2024 | Bhowmick | G06N 20/00 |

FOREIGN PATENT DOCUMENTS

| | | |
|---|---|---|
| CN | 107077487 A | 8/2017 |
| CN | 107085585 A | 8/2017 |
| CN | 107251060 | 10/2017 |
| CN | 107292330 | 10/2017 |
| CN | 107316049 | 11/2017 |
| CN | 107851213 A | 3/2018 |
| KR | 20140117156 | 10/2014 |
| WO | WO2016064576 A1 | 4/2016 |
| WO | WO2017052709 A2 | 3/2017 |

OTHER PUBLICATIONS

Chang, et al., "Learning Representations of Emotional Speech With Deep Convolutional Generative Adversarial Networks," Apr. 22, 2017, retrieved from https://arxiv.org/pdf/1705.02394.pdf, 5 pages.

Choi, et al., "Generating Multi-label Discrete Patient Records using Generative Adversarial Networks," Machine Leaning for Healthcare Conference, PMLR, 2017, 20 pages.

Creswell, et al., "Generative Adversarial Networks: An Overview," Submitted to IEEE—SPM, Apr. 2017, 14 pages.

Dwork, et al., "Pan-Private Streaming Algorithms," Jan. 1, 2010, XP055474103, 32 pages.

Github, Github mean-count-sketch, Jul. 15, 2017, retrieved from https://gitbub.com/barrust/pyprobables/blob . . . , 22 pages.

Goodfellow, "NIPS 2016 Tutorial: Generative Adversarial Networks," Apr. 3, 2017, retrieved from https://arxiv.org/pdf/1701.00160.pdf, 57 pages.

Goodfellow, et al., "Generative Adversarial Nets," Jun. 10, 2014, retrieved from https://arxiv.org/pdf/1406.2661.pdf, 9 pages.

Google, Google Download Instructions, May 6, 2016, downloaded from the wayback machine, https://web.archive.org/web/20160506185913/https://support.google.com/drive/answer/24 . . . , 1 page.

Goyal, et al., "Sketch Algorithms for Estimating Point Queries in NLP," Proceedings of the 2012 Joint Conference on Empirical Methods in Natural Language Processing and Computational Natural Language Learning, 2012, pp. 1093-1103.

Graepel, et al., "ML Confidential: Machine Learning on Encrypted Data," Nov. 28, 2012, Information Security and Cryptology ICISC 2012, 21 pages.

Hitaj, et al., "Deep Models Under the GAN: Information Leakage from Collaborative Deep Learning," Feb. 24, 2017, retrieved from https://arxiv.org/pdf/1702.07464.pdf, 14 pages.

Kingman, et al., "Semi-supervised Learning with Deep Generative Models," Oct. 31, 2014, retrieved from https://arxiv.org/pdf/1406.5298.pdf, 9 pages.

Kumar, et al., "Improved Semi-supervised Learning with GANs using Manifold Invariances," May 24, 2017, retrieved from https://arxiv.org/pdf/1705.08850.pdf.

Liu, et al., "Cloud-Enabled Privacy-Preserving Collaborative Learning for Mobile Sensing," Nov. 6, 2012, SenSys '12, pp. 57-70.

Liu, et al., "Secure Multi-label Classification over Encrypted Data in Cloud," Oct. 17, 2017, International Conference on Computer Analysis of Images and Patterns, CAIP 2017, pp. 57-73.

(56) References Cited

OTHER PUBLICATIONS

Lu, et al., "Poster: A Unified Framework of Differentially Private Synthetic Data Release with Generative Adversarial Network," CCS '17, Oct. 30-Nov. 3, 2017, Dallas, TX, pp. 2547-2549.
Melis, et al., "Efficient Private Statistics with Succinct Sketches," Jan. 6, 2016, Proceedings of 2016 Network and Distributed System Security Symposium, 15 pages.
Nguyen, et al., "Collecting and Analyzing Data from Smart Device Users with Local Differential Privacy," Jun. 16, 2016, retrieved from https://arxiv.org/pdf/1606.05053.pdf, 11 pages.
Papernot, et al., "Semi-supervised Knowledge Transfer for Deep Learning from Private Training Data," Mar. 3, 2017, retrieved from https://arxiv.org/pdf/1610.05755.pdf, 16 pages.
Premachandran, et al., "Unsupervised Learning Using Generative Adversarial Training and Clustering," ICLR 2017 conference paper, 10 pages.
Qin, et al., "Heavy Hitter Estimation over Set-Valued Data with Local Differential Privacy," Oct. 2016, CCS '16, 12 pages.
Radford, et al., "Unsupervised Representation Learning with Deep Convolutional Generative Adversarial Networks," Jan. 7, 2016, retrieved from https://arxiv.org/pdf/1511.06434.pdf, 16 pages.
Springenberg, "Unsupervised and Semi-supervised Learning with Categorical Generative Adversarial Networks," Apr. 30, 2016, retrieved from https://arxiv.org/pdf/1511.06390.pdf, 20 pages.
Weiss, et al., "An Empirical Comparison of Pattern Recognition, Neural Nets, and Machine Learning Classification Methods," 1989, IJCAI, vol. 89, pp. 781-787.
Zhang, et al., "Differentially Private Releasing via Deep Generative Model (technical report)," retrieved from arXiv preprint arXiv:1801.01594, 2018, 11 pages.
Australian Examination Report from Australian Patent Application No. 2019200896, dated Feb. 3, 2020, 4 pages.
Chinese Office Action from Chinese Patent Application No. 201910106947.3, dated Nov. 24, 2022.
European Office Action from European Patent Application No. 19768964.9, dated Feb. 8, 2023, 7 pages.
European Search Report from European Patent Application No. 19153349.6, dated Oct. 30, 2019, 16 pages.
Partial European Search Report from European Patent Application No. 19153349.6, dated Jun. 21, 2019, 15 pages.
Chinese Notice of Allowance from Chinese Patent Application No. 201910106947.3, dated Oct. 16, 2023, 7 pages including machine-generated translation.
Chinese Office Action from Chinese Patent Application No. 201980053510.6, dated May 29, 2024, 19 pages including English language translation.
Chinese Office Action from Chinese Patent Application No. 201980053510.6, dated Jan. 9, 2025, 21 pages with English language translation.
European Office Action from European Patent Application No. 19768964.9, dated Jan. 29, 2025, 6 pages.

\* cited by examiner

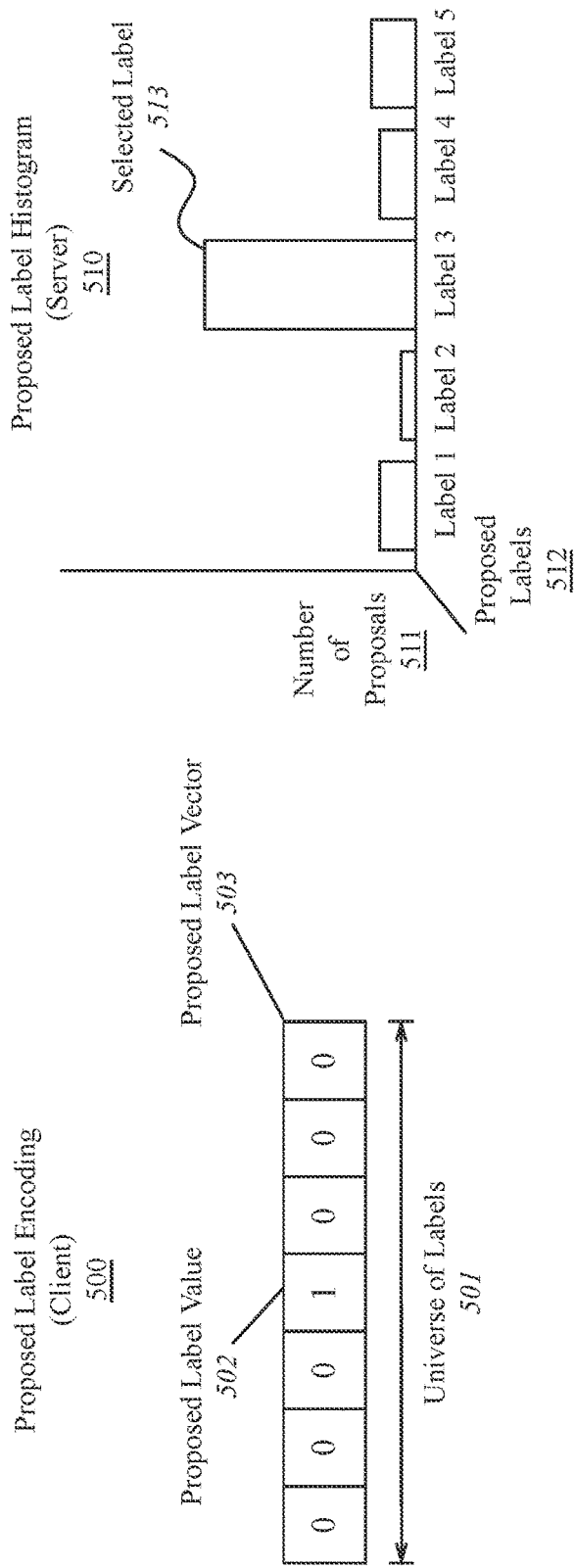

DISTRIBUTED LABELING FOR SUPERVISED LEARNING

CROSS-REFERENCE

This application is a continuation of U.S. patent application Ser. No. 16/556,066, entitled "DISTRIBUTED LABELING FOR SUPERVISED LEARNING," filed on Aug. 29, 2019, which claims benefit of U.S. Provisional Patent Application No. 62/738,990, entitled "DISTRIBUTED LABELING FOR SUPERVISED LEARNING," filed Sep. 28, 2018, each of which is hereby incorporated herein in its entirety.

TECHNICAL FIELD

This disclosure relates generally to the field of machine learning via privatized data. More specifically, this disclosure relates to a system that implements one or more mechanisms to enable privatized distributed labeling for supervised training of machine learning models.

BACKGROUND

Machine learning is an application of artificial intelligence that enables a complex system to automatically learn and improve from experience without being explicitly programmed. The accuracy and effectiveness of machine learning models can depend in part on the data used to train those models. For example, machine learning classifiers can be trained using a labeled data set, in which samples of data that the classifier is to learn to recognize are provided to the classifier along with one or more labels that identify a classification for the sample. Generally, a larger training dataset results in a more accurate classifier. However, current techniques used to prepare training datasets may be painstaking, time consuming, and expensive, particularly techniques that involve the manual labeling of data to generate the training dataset.

SUMMARY

Embodiments described herein provide a technique to crowdsource labeling of training data for a machine learning model while maintaining the privacy of the data provided by crowdsourcing participants. Client devices can be used to generate proposed labels for a unit of data to be used in a training dataset. One or more privacy mechanisms are used to protect user data when transmitting the data to a server.

One embodiment provides for a data processing system comprising a memory device to store instructions and one or more processors to execute the instructions stored on the memory device. The instructions cause the data processing system to perform operations comprising sending an unlabeled set of data to a set of multiple mobile electronic devices, the set of multiple mobile electronic devices to generate a set of proposed labels for the unlabeled set of data, wherein each of the mobile electronic devices include a variant of a first machine learning model; receiving a set of proposed labels for the unlabeled set of data from the set of multiple mobile electronic devices, the set of proposed labels encoded to mask individual contributors of each proposed label in the set of proposed labels; processing the set of proposed labels to determine a most frequent proposed label for the unlabeled set of data; adding the unlabeled set of data and the most frequent proposed label to a first training set; and training a second machine learning model using the first training set, the second machine learning model on a server device.

One embodiment provides for a non-transitory machine readable medium storing instructions to cause one or more processors to perform operations comprising sending an unlabeled set of data to a set of multiple mobile electronic devices, the set of multiple mobile electronic devices to generate a set of proposed labels for the unlabeled set of data, wherein each of the mobile electronic devices include a first machine learning model; receiving a set of proposed labels for the unlabeled set of data from the set of multiple mobile electronic devices, the set of proposed labels encoded to mask individual contributors to the set of proposed labels; processing the set of proposed labels to determine an estimate of a most frequent proposed label for the unlabeled set of data; adding the unlabeled set of data and corresponding most frequent proposed labels to a first training set; and training a second machine learning model using the first training set, the second machine learning model on a server device.

One embodiment provides for a data processing system on a mobile electronic device, the data processing system comprising a memory device to store instructions and one or more processors to execute the instructions stored on the memory device. The instructions cause the one or more processors to select a set of data on the mobile electronic device; generate a training set based on selected data; train a first machine learning model using the training set; receive an unlabeled set of data from a server; generate proposed labels for elements of the unlabeled set of data; and transmit a privatized version of one or more proposed labels to the server.

One embodiment provides for a non-transitory machine readable medium storing instructions to cause one or more processors to perform operations comprising selecting a set of data on a mobile electronic device; generating a training set based on selected data; training a first machine learning model using the training set, the first machine learning model trained on the mobile electronic device; receiving an unlabeled set of data from a server; generating proposed labels for elements of the unlabeled set of data; and transmitting a privatized version of a proposed label to the server.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

FIGS. 5A-5C illustrate exemplary privatized data encodings that can be used in embodiments described herein that implement privatization via differential privacy.

DETAILED DESCRIPTION

Various embodiments and aspects will be described herein with reference to details discussed below. The accompanying drawings will illustrate the various embodiments. The following description and drawings are illustrative and are not to be construed as limiting. Numerous specific details are described to provide a thorough understanding of various embodiments. However, in certain instances, well-known or conventional details are not described to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment. It should be noted that there could be variations to the flow diagrams or the operations described therein without departing from the embodiments described herein. For instance, operations can be performed in parallel, simultaneously, or in a different order than illustrated.

A key roadblock in the implementation of many supervised learning techniques is the requirement to have labeled data on the training server. Existing solutions to the labeled data problem include centralizing the training data and manually annotating the data with one or more labels. Where the training data is user data, maintaining such data on a server can risk a loss of user privacy. Additionally, manually labeling the training data may be cost prohibitive.

Figure 1:
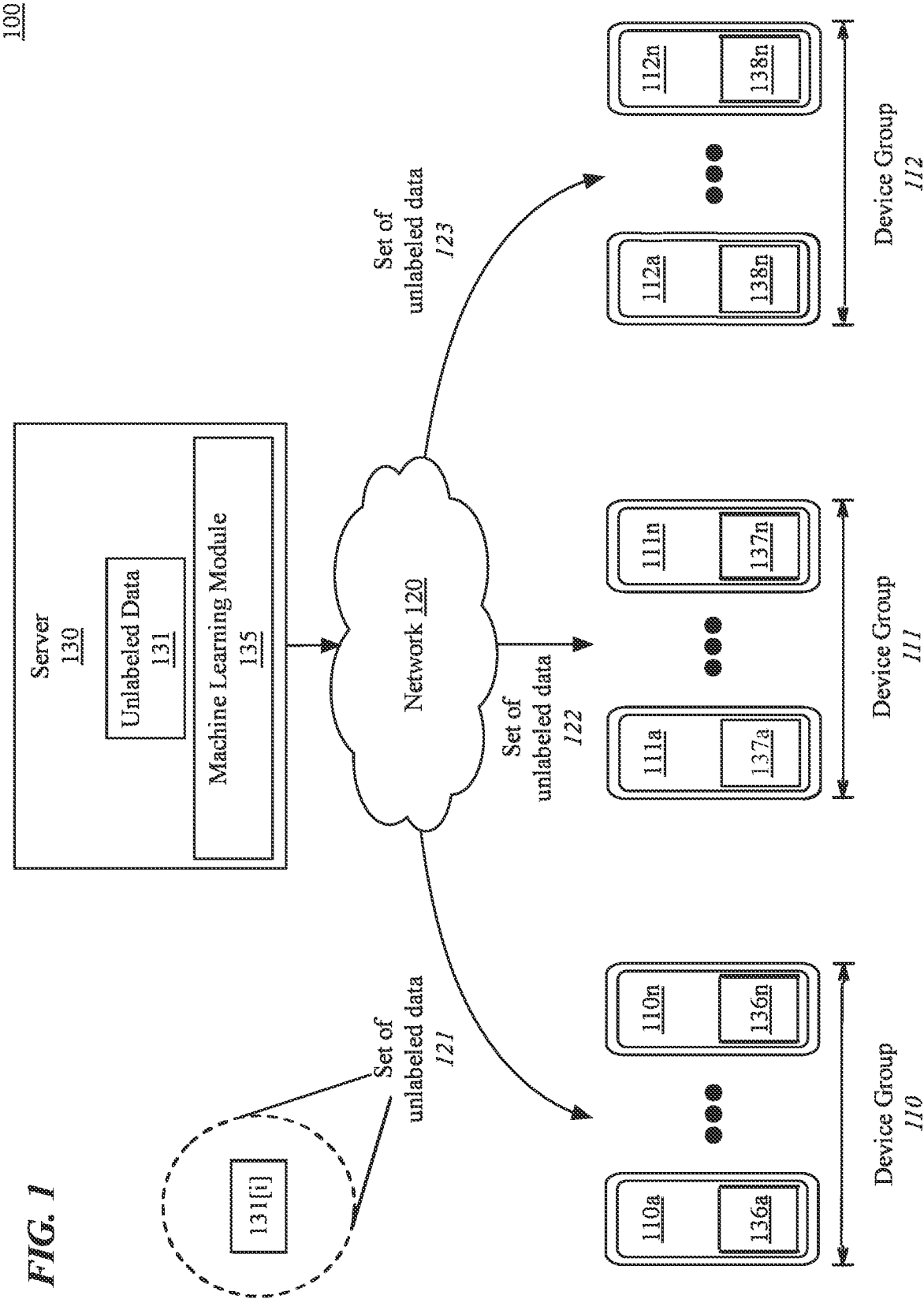
FIG. 1 illustrates a system to enable crowdsourced labeling of training data for a machine learning model according to embodiments described herein.

FIG. 1 illustrates a system 100 to enable crowdsourced labeling of training data for a machine learning model according to embodiments described herein. As shown in FIG. 1, in one embodiment, a server 130 can connect with a set of client devices 110a-110n, 111a-111n, 112a-112n over a network 120. The server 130 can be any kind of server, including an individual server or a cluster of servers. The server 130 can also be or include a cloud-based server, application server, backend server, virtual server, or combination thereof. The network 120 can be any suitable type of wired or wireless network such as a local area network (LAN), a wide area network (WAN), or combination thereof. Each of the client devices can include any type of computing device such as a desktop computer, a tablet computer, a smartphone, a television set top box, or other computing device. For example, a client device can be an iPhone®, Apple® Watch, Apple® TV, etc., and can be associated with a user within a large set of users to which tasks can be crowdsourced with the permission of the user.

In one embodiment, the server 130 stores a machine learning module 135, which can include a machine learning model implemented using on a neural network, such as but not limited to a deep learning neural network. For example, the machine learning module 135 can include a convolutional neural network (CNN) or a recurrent neural network (RNN), including a long short-term memory (LSTM) variant of an RNN. Other types of machine learning models and/or neural networks can be used. The machine learning module 135 can include an implementation of a basic, low accuracy learning model that untrained or pre-trained using generic data. The server 130 can also store a set of unlabeled data 131. In one embodiment, the unlabeled data 131 is a large set of data that will be labeled and used to increase the accuracy of the machine learning module 135.

The unlabeled data 131 includes several types of data, including the types of data for which the machine learning module 135 can be configured to classify. However, the system 100 is not limited for use with any particular type of data and can be configured based on the type of data to be learned or classified. For example, the system 100 can be used for image data, but is not limited to any specific type of data. For example, image data can be used for an image-based classification model, such as an image classifier, which can be configured for object detection or facial recognition. The system 100 can also be configured to train a predictive system. A sequence of characters and words can be used to train a predictive model for a predictive keyboard. For example, the machine learning module 135 can be trained such that, for a given set of input characters, a next character or word can be predicted. A sequence of applications can be used to train an application predictor. For example, for a given sequence of applications accessed or used by a user, the machine learning module 135 can be trained to predict the next application or applications that are likely to be accessed by a user and present icons for those applications in an area of a user interface that is easily and readily accessible to the user. In one embodiment, a mapping application can use a variant of the machine learning module 135 to predict a navigation destination for a user based on a reset of recent locations or destinations for a user. In one embodiment a combination of device and application activity can be used to train the machine learning module 135 to predict upcoming user activities with a device. For example, when a mobile device connects to an automobile's Bluetooth audio, or other in-vehicle infotainment device, on a weekday morning, the machine learning module 135 can be used to predict that the user is preparing to commute to a work destination. In one embodiment, data associated with virtual assistant shortcuts can also be used to train the machine learning module 135. Virtual assistant shortcuts can be used to automate one or more tasks across multiple applications of the device.

The client devices can be organized into device groups (e.g., device group 110, device group 111, device group 112) that can each contain multiple client devices. Each device group can contain n devices, where n can be any number of devices. For example, device group 110 can contain client device 110a-110n. Device group 111 can contain client device 111a-111n. Device group 112 can contain client device 112a-112n. In one embodiment, each device group can contain up to 128 devices, although the number of client devices in each device group can vary across embodiments and is not limited to any specific number of devices. In general, a large number of devices are used per group to enable the labeling system to be resilient against dropouts by clients within a group, such that the system does not require all devices within a group to provide a proposed label. The number of devices in each device group can be the same for each group or can vary across groups. In one embodiment, the server 130 may require a threshold number of devices within each group to send a proposed label before a specific one of the proposed labels is selected.

In one embodiment, each client device (client device 110a-110n, client device 111a-111n, client device 112a-112n) can include a local machine learning module. For example, client device 110a-110n of device group 110 can each contain corresponding local machine learning module 136a-136n. Client device 111a-111n of device group 111 can each contain corresponding local machine learning module 137a-137n. Client device 112a-112n of device group 112 can each contain a corresponding local machine learning module 138a-138n. In various embodiments, the local machine learning modules can be loaded on each client device during factory provisioning or can be loaded or updated when a system image of the client device is updated. In one embodiment, each local machine learning module can initially be a variant of the machine learning module 135 of the server. However, the local machine learning modules can include different types of learning models than the learning model used by the server. In one embodiment, the local machine learning modules 136a-136n, 137a-137n, 138a-138n on each client device can include LSTM networks, while the machine learning module 135 on the server 130 may be a CNN. The local machine learning models on the client devices be individualized to each client device by training on local data stored on the client device.

In one embodiment, devices are grouped based on the type of data upon which their respective machine learning models will be trained. For example, the local machine learning modules 136a-136n can be trained on text data stored on client devices 110a-110n, while machine learning modules 137a-137n can be trained on image data stored on client devices 111a-111n. Local machine learning modules 138a-138n can be trained on application or device activity data associated with client devices 112a-112n. In one embodiment the server 130 and the client devices can synchronize on the types of available data to be used to training and the devices can be grouped accordingly.

The server can provide a set of unlabeled data (e.g., a set of unlabeled data 121, a set of unlabeled data 122, a set of unlabeled data 123) to each client device within each device group. The sets of unlabeled data can each include one or more units of unlabeled data 131[i] for which the client devices can generate proposed labels based on the individualized machine learning modules 136a-136n, 137a-137n, 138a-138n on each client device. In one embodiment, the set of unlabeled data transmitted to devices in a device group includes the same unit or units of unlabeled data, with each device group receiving a different unit of unlabeled data. For example, the set of unlabeled data 121 provided to each client device 110a-110n in device group 110 can include a first unit of unlabeled data. The set of unlabeled data 122 provided to each client device 111a-111n in device group 111 can include a second unit of unlabeled data. The unlabeled data 123 provided to each client device 112a-112n in device group 112 can include a third unit of unlabeled data.

Figure 2:
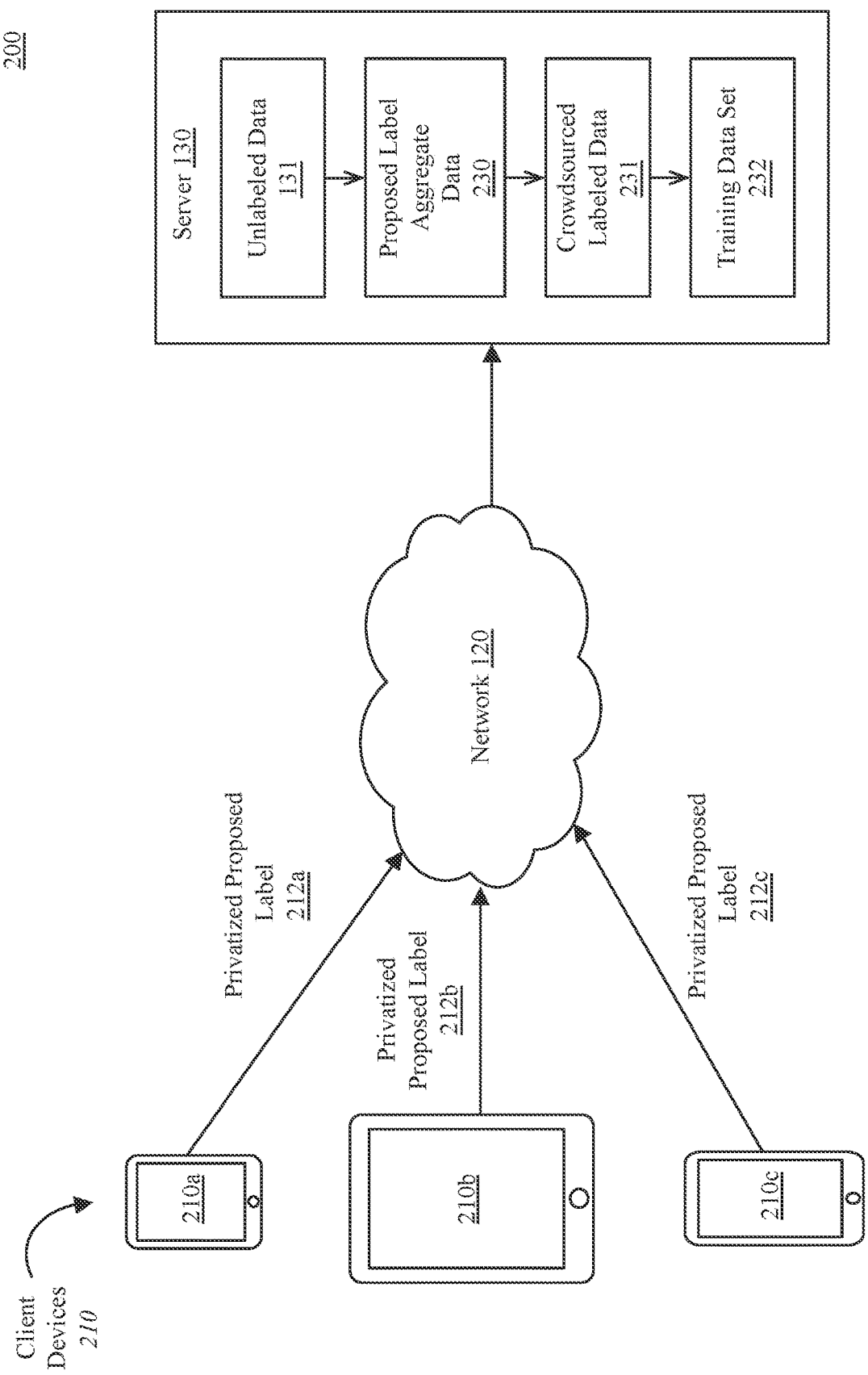
FIG. 2 illustrates a system for receiving privatized crowdsourced labels from multiple client devices, according to an embodiment.

FIG. 2 illustrates a system 200 for receiving privatized crowdsourced labels from multiple client devices, according to an embodiment. In one embodiment, the system 200 includes a set of client devices 210a-210c (collectively, 210), which can be any of the client devices described above (e.g., client devices 110a-110n, 111a-111n, 112a-112n). The client devices 210, using the techniques described above, can each generate privatized proposed labels 212a-212c (privatized proposed label 212a from client device 210a, privatized proposed label 212b from client device 210b, privatized proposed label 212c from client device 210c) which each can be transmitted to the server 130 via the network 120. In one embodiment, the privatized proposed labels 212a-212c are sent as a tuple that includes a proposed label and the element of the set of unlabeled data to which the proposed label corresponds. In one embodiment the transmitted tuple includes the proposed label and an identifier of the associated element of the set of unlabeled data. In one embodiment, multiple tuples of proposed labels and associated elements can be transmitted from one or more of the client devices 210 depending on the privacy budget available to the transmitting device.

The illustrated client devices 210 can be in the same device group or different device groups. For example, client device 210a can represent client device 110a of device group 110 in FIG. 1, while client device 210b can represent client device 111a of device group 111 in FIG. 1. Where the client devices 210 are in different device groups, the privatized proposed labels 212a-212c can each correspond with a different unit or units of unlabeled data provided by the server 130. For example, client device 210a can receive at least a first unit of unlabeled data, which can differ from a second unit of unlabeled data received by client device 210b. Where the client devices 210 are in the same device group, the privatized proposed labels 212a-212c can correspond with the same unit or units of unlabeled data provided by the server (e.g., unlabeled data 131[i] in the set of unlabeled data 121 shown in FIG. 1). Although the proposed labels are for the same unit of data, the labels proposed by the client devices 210 can differ, as the labels are proposed based on individualized machine learning models on each client device, where the individualized machine learning models are individualized based on the local data stored in each client device 210a-210c.

Prior to transmission to the server 130 over the network 120, the proposed labels generated on the client devices 210 are privatized to generate the privatized proposed labels 212a-212c. The privatization is performed to mask the identity of the contributor of any proposed label in the crowdsourced dataset and can be performed using one or more data privatization algorithms or techniques. Some embodiments described herein apply a differential privacy encoding to the proposed labels, while other embodiments can implement homomorphic encryption, secure multiparty compute, or other privatization techniques.

The server 130 maintains data store of proposed label aggregate data 230, which is an aggregation of the privatized proposed labels 212a-212c received from the client devices 210. The format of the proposed label aggregate data 230 can vary based on the privatization technique applied to the proposed labels. In one embodiment, a multibit histogram differential privacy technique is used to privatize the proposed labels and the proposed label aggregate data 230 is a histogram containing proposed label frequency estimates. The server can process the proposed label aggregate data 230 to determine a most frequently proposed label for each unit of unlabeled data 131 and label each unit, generating a set of crowdsourced labeled data 231. The crowdsourced labeled data 231 can then be used to train and enhance machine learning models.

Figure 3A:
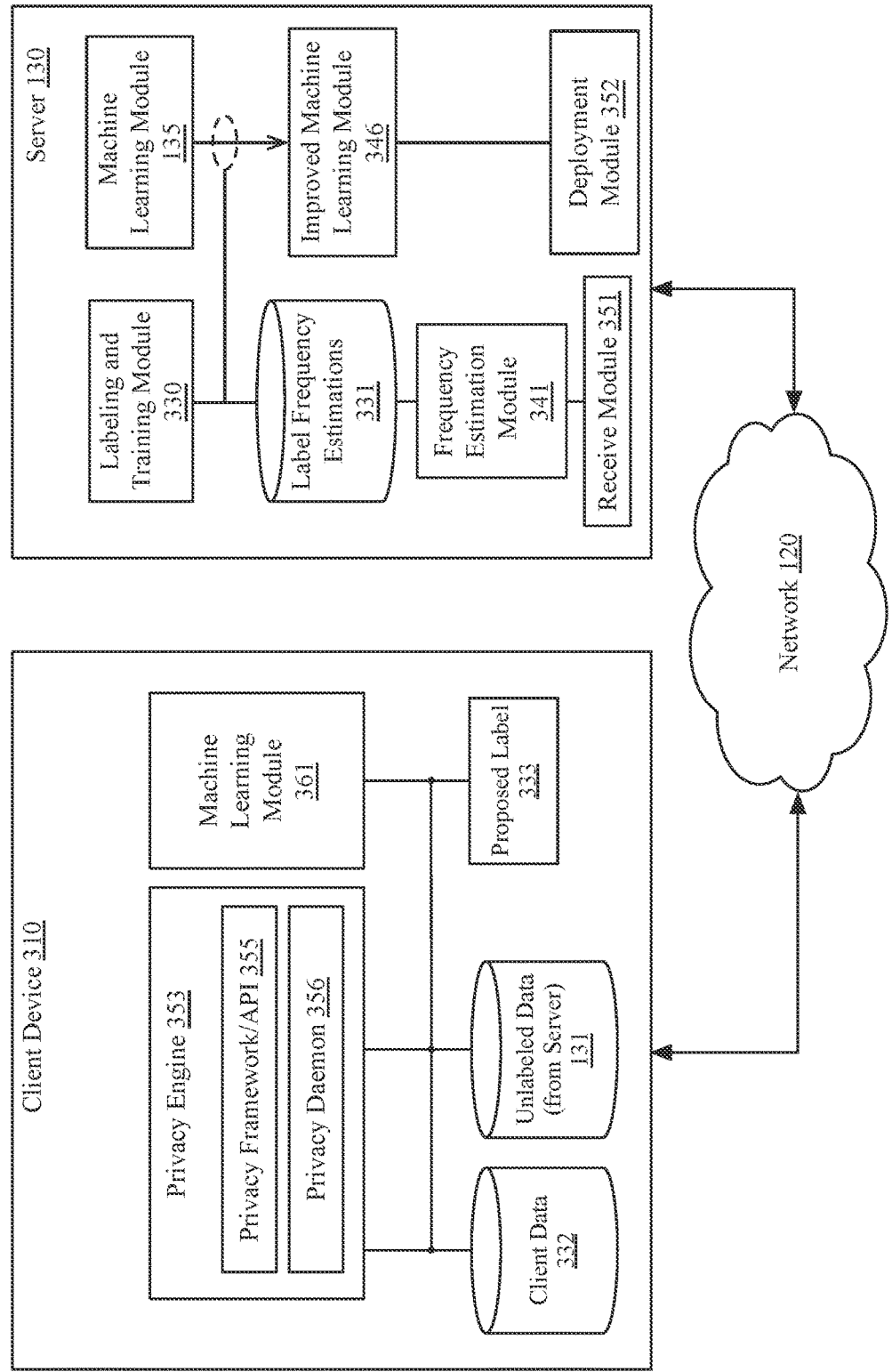
FIG. 3A is a block diagram of a system for generating privatizing proposed labels for server provided unlabeled data, according to an embodiment.

FIG. 3A is a block diagram of a system 300 for generating privatizing proposed labels for server provided unlabeled data, according to an embodiment. The system 300 includes a client device, which can be any of client devices 110a-110n, 111a-111n, 112a-112n or client devices 210. The client device 310 includes a machine learning module 361 to perform supervised learning, having a learning model that has been trained using client data 332 on the client device 310. The trained machine learning module 361 can then be used to generate a proposed label 333 for one or more elements of unlabeled data 131 received from the server 130. In one embodiment, the client device 310 can have a privacy engine 353 that includes a privacy daemon 356 and a privacy framework or application programming interface (API) 355. The privacy engine 353 can use various tools, such as hash functions, including cryptographic hash functions, to privatize a proposed label 333 generated by the client device 310. In one embodiment the privacy engine 353 can privatize the proposed label 333 using one or more of a variety of privatization techniques including, but not limited to differential privacy algorithms. The privatized proposed label 333 can then be transmitted to the server 130 via the network 120.

The server 130 can include a receive module 351 and a frequency estimation module 341 to determine label frequency estimations 331, which can be stored in various data structures, such as an array as in the multibit histogram algorithm. The receive module 351 can asynchronously receive crowdsourced privatized labels of from a large plurality of client devices. In one embodiment, the receive module 351 can remove latent identifiers from the received data. Latent identifiers can include IP addresses, metadata, session identifiers, or other data that might identify the client device 310. The frequency estimation module 341 can also process received privatized proposed labels using operations such as, but not limited to a count-mean-sketch or multi-bit histogram operations. The label frequency estimations 331 can be analyzed by a labeling and training module 330, which can determine labels for unlabeled server data by applying to each unit of unlabeled data, for example, the highest frequency label received for the unit of unlabeled server data, although other methods of determining labels can be used. The labeling and training module 330 can use the determined labels to train an existing server-side machine learning module 135 into an improved server-side machine learning module 346. In one embodiment, the client device 310 and the server 130 can engage in an iterative process to enhance the accuracy of a machine learning model implemented by the machine learning module. In one embodiment the improved machine learning module 346 can be deployed to the client device 310 via a deployment module 352 if the machine learning module 361 on the client device 310 is compatible with the improved machine learning module 346. Alternatively, a version of the machine learning models used by the client device 310 can be enhanced or updated on the server 130 and deployed to the client device 310 via the deployment module 352, for example if the machine learning module 361 implements a different type of model as the improved machine learning module 346 on the server 130. In one embodiment the deployment module 352 can also be used to distribute the unlabeled data 131 from the server 130 to the client device 310.

Figure 3B:
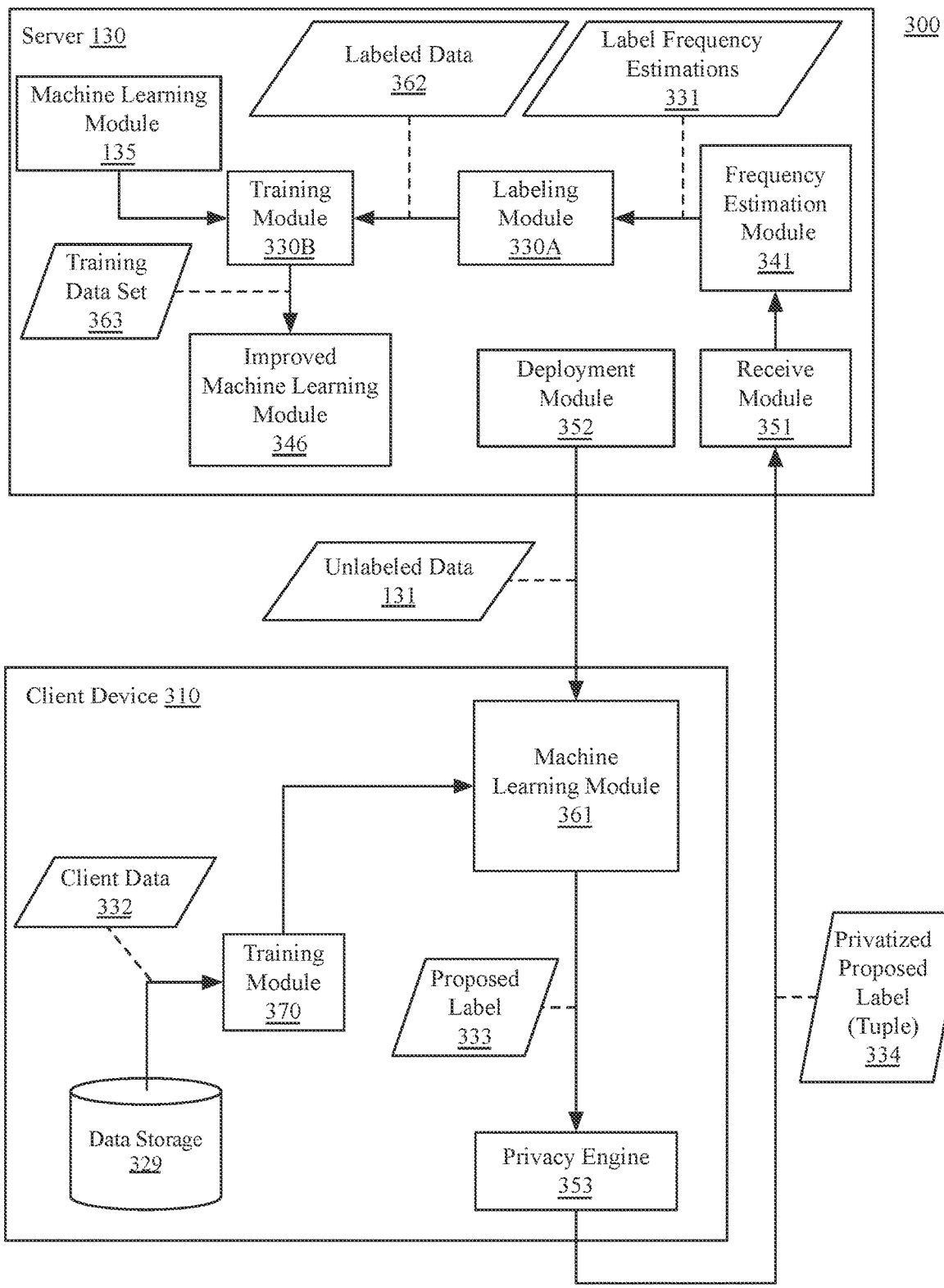
FIG. 3B is a diagram of data flow for system, according to an embodiment.

FIG. 3B is a diagram of data flow for system 300, according to an embodiment. Unlabeled data 131 from the server 130 can be transmitted to a client device 310 for processing by the machine learning module 361 on the client device. In one embodiment the unlabeled data 131 can be distributed to the various client devices via a deployment module 352. The machine learning module 361 on the client device 310 can be trained via a training module 370 based on client data 332 within data storage 329 on the client device 310. The client data 332 can include various types of client data, such as text message data, image data, application activity data, device activity data, and/or a combination of application activity and device activity data.

The machine learning module 361, having been trained by the training module 370, can generate at least one proposed label 333 for at least one unit of unlabeled data 131. In one embodiment, a proposed label is generated for multiple units of unlabeled data 131. Although multiple proposed labels can be generated, the number of privatized proposed labels transmitted to the server 130 may be limited based on a privacy budget configured for the client device 310. In one embodiment, the mobile electronic device maintains a privacy budget that limits the amount of privatized data that can be transmitted to the server within a given timeframe. In such embodiment, once a certain amount of privatized data has been transmitted to the server, the mobile electronic device will refrain from sending any other privatized data for a period of time.

The privacy engine 353 can privatize the proposed label using one or more of a variety of privatization techniques, including but not limited to differential privacy techniques, homomorphic encryption, or secure multi-party computation. For each privatization technique, the server 130 will include corresponding logic to process the privatized data. Using a selected privatization technique, the privacy engine 353 generates at least one privatized proposed label 334, which is encoded to mask the relationship between the proposed label 333 and the client device 310.

The privatized proposed label 334 can be transmitted from the client device 310 to the server 130. In one embodiment the privatized proposed label 334 is a tuple that contains a pairing of a privatized proposed label and an identifier of the unit of unlabeled data that corresponds with the proposed label. In one embodiment, instead of an identifier for the unit of unlabeled data, the tuple can directly include the unit of unlabeled data. Whether the unit of unlabeled data or an identifier for the unit is included can vary depending on the size of the individual units of unlabeled data to be labeled. For example, an identifier for image data can be transmitted with the proposed label, while proposed label for a character sequence can be directly included within the tuple.

In one embodiment the server 130 receives the privatized proposed label 334 via the receive module 351. The receive module 351 can provide the various privatized labels from the various instances of the client device 310 to the frequency estimation module 341. The frequency estimation module 341 can determine label frequency estimations 331 to estimate the most frequent proposed label for a given unit of unlabeled data 131. The labeling and training module 330 can include a labeling model 330A to label each unit of unlabeled data, for example, with the highest frequency proposed label for the unit, generating a set of labeled data 362. A training module 330B of the labeling and training module 330 can then add the labeled units of data to a training data set 363. The training data set 363 can be used by the training module 330B to train the machine learning module 135 to improve the accuracy of the machine learning model, resulting in an improved machine learning module 346.

Figure 4A:
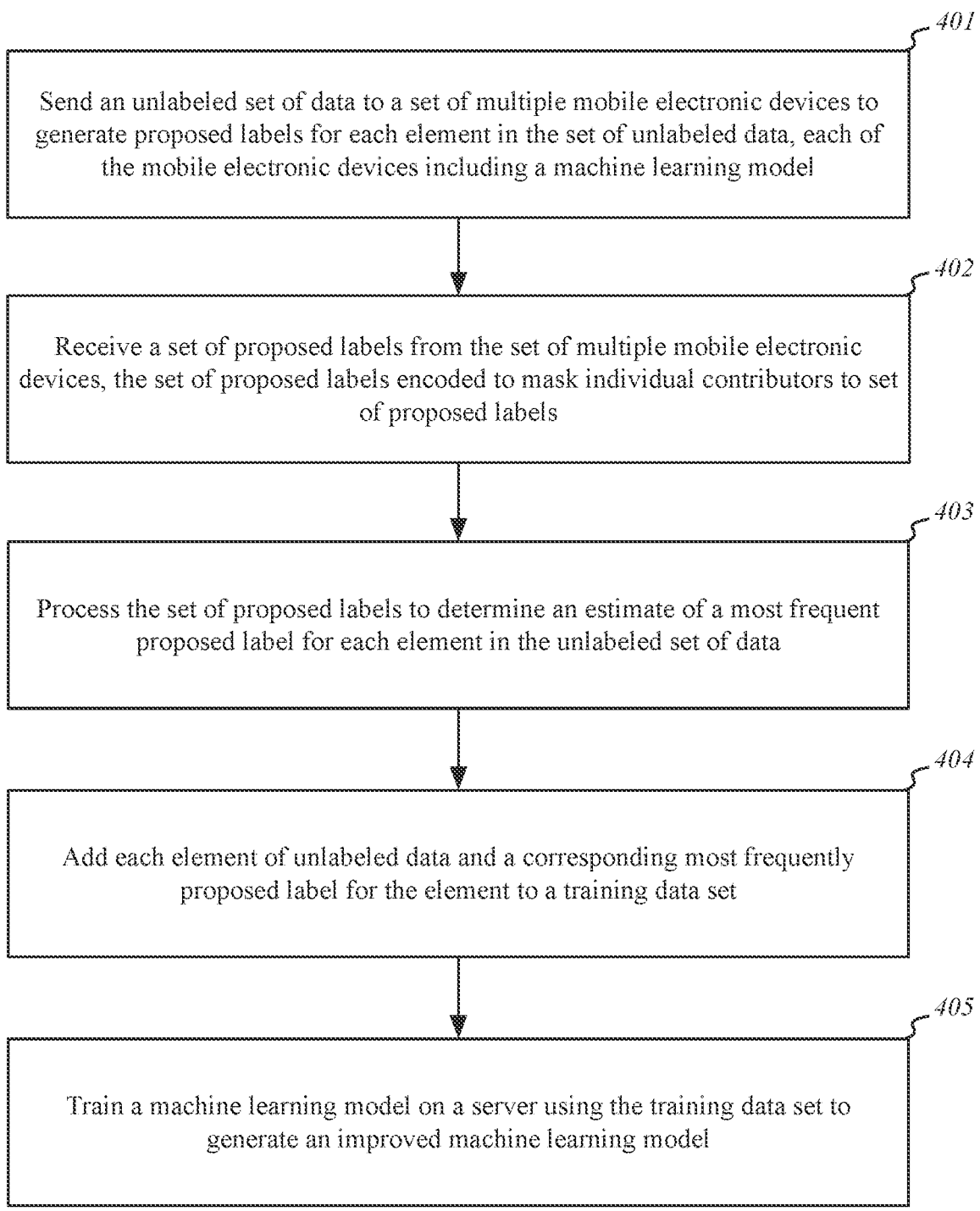
FIG. 4A is a flow diagram of a method to improve the accuracy of a machine learning model via crowdsourced labeling of unlabeled data, according to an embodiment.

FIG. 4A is a flow diagram of a method 400 to improve the accuracy of a machine learning model via crowdsourced labeling of unlabeled data, according to an embodiment. The method 400 can be implemented in a server device, such as server device 130 as described herein.

In one embodiment, method 400 includes for the server to perform operation 401, which includes to send a set of unlabeled data to a set of multiple mobile electronic devices. The set of multiple mobile electronic devices are each configured to generate proposed labels for elements in the set of unlabeled data. Each of the mobile electronic devices can include a machine learning model. The machine learning model can be one of a variety of machine learning models including, but not limited to a multiclass classification model or a regression model. The machine learning models can be implemented using a variety of techniques including convolutional or recurrent neural networks.

Method 400 additionally includes operation 402, in which the server receives a set of proposed labels from the set of multiple mobile electronic devices. The set of proposed labels are encoded to mask individual contributors to the set of proposed labels. The client devices can encode the proposed labels using one or more of a variety of privacy preserving techniques, including differential privacy encoding, homomorphic encryption, secure multiparty compute, or other privatization techniques. In one embodiment, a client and server-side differential privacy algorithm is applied to the proposed labels, such as a count-mean-sketch algorithm or a multi-bit histogram algorithm.

Method 400 additionally includes operation 403, in which the server processes the set of proposed labels to determine an estimate of a most frequent proposed label for each element in the unlabeled set of data. The processing can include applying a server-side count-mean-sketch or multi-bit histogram algorithm to generate a sketch or histogram from which frequencies of proposed labels can be estimated. From the frequency data, an estimate of a proposal frequency of each label can be determined for each element. The most frequently proposed label for each element in the set of unlabeled data can be used to generate labels for the elements in the set of unlabeled data. Method 400 can then perform operation 404 to add each element of unlabeled data and a corresponding most frequently proposed label for the element to a training data set. The method 400 additionally include operation 405, in which the server trains the machine learning model using the training data set to generate an improved machine learning model.

Figure 4B:
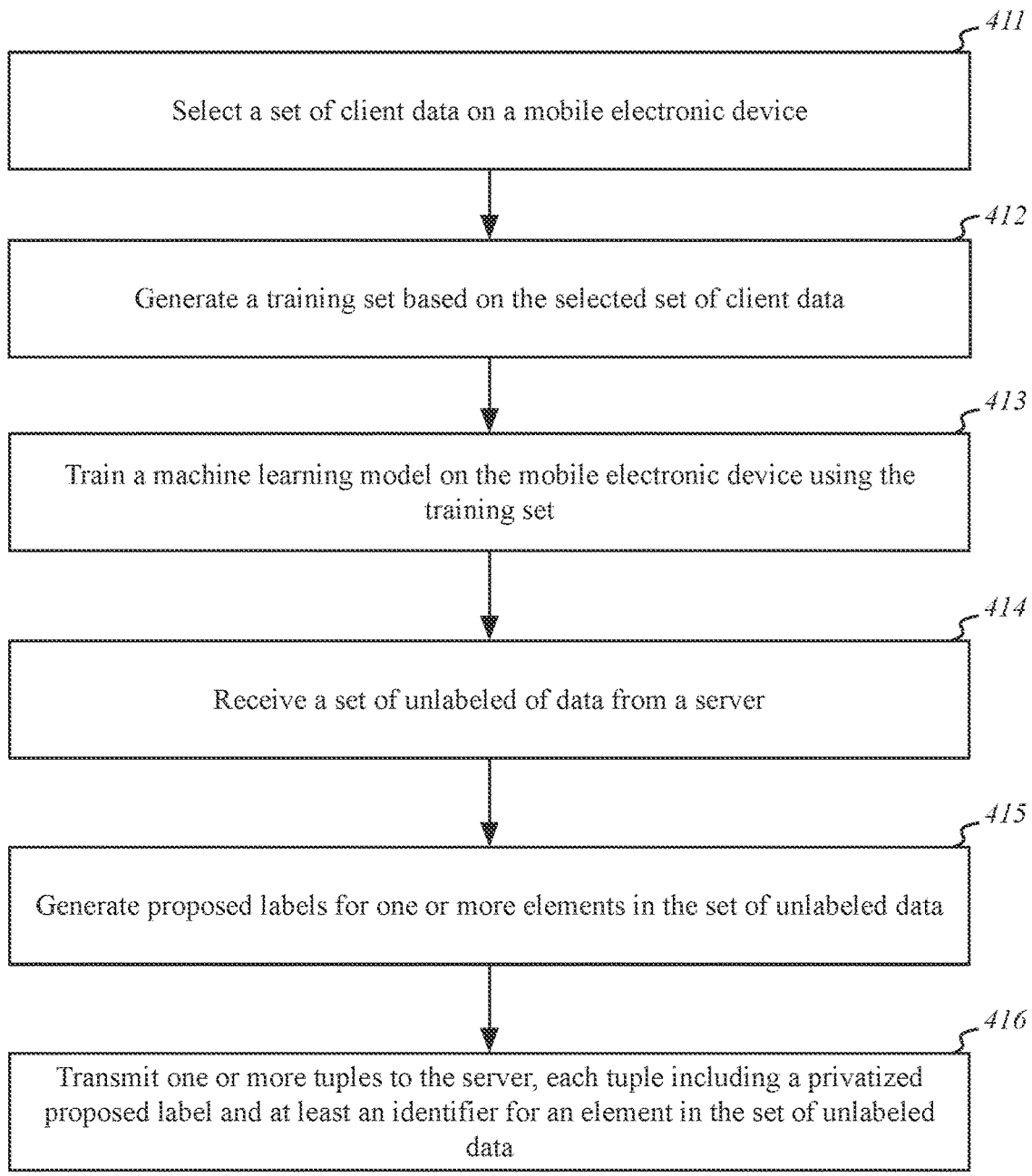
FIG. 4B is a flow diagram of a method to generate a privatized proposed label on a client device, according to an embodiment.

FIG. 4B is a flow diagram of a method 410 to generate a privatized proposed label on a client device, according to an embodiment. The method 410 can be implemented in a client device, such as client device 310 as described herein. In one embodiment, and as described below, the client device is a mobile electronic device. However, other types of client devices can be used in some embodiments, such as desktop or laptop computing devices.

In one embodiment, method 410 includes operation 411 to select a set of client data on a mobile electronic device. A variety of different types of client data can be used to generate the training data set. For example, images on the device can be used to train an image classifier or text data can be used to train a word or character prediction model. In one embodiment, word sequences typed by a user can be used to train a predictive text model, which can be used to suggest words within a keyboard application. The specific type of data that is selected can be determined or limited based on privacy settings configured for the mobile electronic device. For example, a user of the mobile electronic device can opt-in or opt-out of the use of certain types of data for crowdsourced labeling. In one embodiment, various types of client data on the mobile electronic device are analyzed and the set of client data is selected from the types of client data that have elements sufficient in number to generate a viable training data set. A sufficient number of elements, in this case, is a number of elements over a mathematical threshold associated with the machine learning model that enables the model to be trained to a specified minimum level of accuracy.

Method 410 additionally includes operation 412 to generate a training set based on the selected set of client data. Generating the training set can include associating client data with labels associated with that client data. In one embodiment, the labels can be assigned to elements of client data by a user or can be labels that are auto-assigned using other classification logic available to the client device. In one embodiment the labels associated with images can be general labels with broad applicability, such as object labels (e.g., person, tree, house, apple, orange, cat, dog, etc.). In one embodiment, sequence data stored on the mobile electronic device can be partitioned for sequential learning. For example, the text sequence "Where are you" can be divided into a feature ("Where are") and a label ("you"). Alternatively, a feature ("Where are you") can have the label ("?"). Additionally, feature ("Where") can be labeled ("are you?") or ("is it?") depending on the client data on the mobile electronic device. In one embodiment, application or device activity sequences stored on the mobile electronic device can be partitioned into features and labels. For example, a sequence of regular device activities including connecting to a power source, connecting to a Bluetooth device, leaving from or arriving to a specific location, or launching a specific application, can be analyzed to determine a set of regular activities performed on or with the mobile electronic device. Activities that are regularly performed in a specific sequence can be classified as sequence features having a label that enables prediction of the next activity in the sequence. For example, an activity feature including connecting to a certain Bluetooth audio device during a certain timeframe can be labeled as an application prediction ("Maps") for the next application likely to be launched. If a map application is generally launched during this sequence, a navigation destination prediction ("Work") can be applied as the label for the sequence feature.

Method 410 additionally includes operation 413 to train a machine learning model on the mobile electronic device using the training set. The training can be performed directly on the mobile electronic device, for example, when the device is idle and connected to a power source. The specific features and labels within the training set can vary between devices. Accordingly, the machine learning models on the mobile electronic devices will become individualized to each device. The training data set and the trained models cannot be transmitted from the mobile electronic devices to the server without leaking data that may be private to the user of the mobile electronic device. Instead, the server can send unlabeled data to the various mobile electronic devices. Thus, method 410 additionally includes operation 414 to receive a set of unlabeled data from a server. The set of unlabeled data can include one or more different types of data including but not limited to image data, text sequence data, and/or device activity data. The mobile electronic device can perform operation 415 to generate a proposed label for one or more elements in the set of unlabeled data. The number of proposed labels that are generated can vary, and in one embodiment is limited in part based on a privacy budget associated with the mobile electronic device.

In one embodiment, the unlabeled set of data is of the same type as the selected set of user data. In such embodiment, the mobile electronic device can communicate the type of data used to train the local machine learning model. In one embodiment, multiple types of unlabeled data are sent to the mobile electronic device. A data type can be associated with the various elements of unlabeled data and the mobile electronic device can generate labels for the type of data upon which the local model has been trained. In one embodiment, cryptographic or other algorithm can be used to enable the mobile electronic device and the server to agree on a type of data that will be used to train the machine learning model on the device. For example, the type of data to use can be determined based on function that uses a device identifier of the mobile electronic device as input. Alternatively, a hash of an identifier associated with a cloud services account of a user can be used, or any other combination of function and input that is known by the mobile electronic device and the server.

Method 410 additionally includes operation 416, in which the mobile electronic device can transmit a privatized version of one or more proposed labels to the server. In one embodiment, operation 416 includes to transmit one or more tuples to the server, where each tuple includes a privatized proposed label and at least an identifier for an element in the set of unlabeled data. In one embodiment each element in the set of unlabeled data has an associated identifier that is known to the server. The server can use the identifier provided within the tuple to associate the privatized proposed label with the element for which the label is proposed. In one embodiment, where transmission and/or privacy budgets allow, the tuple includes the actual unit of unlabeled data along with the privatized proposed label for the unit of data. Whether the unit of unlabeled data or an identifier for the unit of unlabeled data can vary based on configuration, privacy/transmission budgets, or the type of data being labeled.

In some embodiments, the mobile electronic device can generate labels for multiple elements of unlabeled data. In such embodiments, operation 416 includes transmitting multipole tuples. The mobile electronic device can also be configured to send only one label or only a portion of a label to the server. Embodiments described herein are bandwidth efficient in that only a small amount of data is transmitted by the client device. For example, in one embodiment in which a count-mean-sketch algorithm is used, only 256 bits of data is transmitted to propose a label to the server.

The privatized version of the proposed label can be created using one or more of a variety of a privacy-preserving encoding described herein, such as but not limited to a differential privacy encoding or other privacy preserving techniques such as homomorphic encryption or secure multi-party compute.

The server can receive privatized proposed labels from multiple mobile electronic devices and aggregate the data and process the data using method 400 above. From the aggregated data, the server can estimate the most frequently applied label for elements of the unlabeled data sent to the mobile electronic devices and generate a training data set to enhance a server-based machine learning model. In some embodiments, method 400 and method 410 can proceed iteratively, in which a server-based machine learning model is enhanced using labels provided by multiple client devices and, after a period of time, the machine learning models on the mobile electronic devices can be updated. The updated machine learning models on the client devices can then be used to propose new labels to the server.

Proposed Label Privatization via Differential Privacy.

In some embodiments, one or more differential privacy techniques are applied to the crowdsourced proposed labels to mask the identity of contributors of the proposed labels. As a general overview, local differential privacy introduces randomness to client user data prior to sharing the user data. Instead of having a centralized data source $D=\{d_1, \ldots, d_n\}$, each data entry $d_i$ belongs to a separate client i. Given the transcript $T_i$ of the interaction with client i, it is may not be possible for an adversary to distinguish $T_i$ from the transcript that would have been generated if the data element were to be replaced by null. The degree of indistinguishability (e.g., degree of privacy) is parameterized by $\varepsilon$, which is a privacy parameter that represents a tradeoff between the strength of the privacy guarantee and the accuracy of the published results. Typically, $\varepsilon$ is considered to be a small constant. In some embodiments, the $\varepsilon$ value can vary based on the type of data to be privatized, with more sensitive data being privatized to a higher degree (smaller $\varepsilon$). The following is a formal definition of local differential privacy.

Let n be the number of clients in a client-server system, let $\Gamma$ be the set of all possible transcripts generated from any single client-server interaction, and let $T_i$ be the transcript generated by a differential privacy algorithm A while interacting with client i. Let $d_i \in S$ be the data element for client i. Algorithm A is $\varepsilon$-locally differentially private if, for all subsets $T \subseteq F$, the following holds:

$$\forall i \in [n], d \in S, \left| \ln \frac{Pr[T_i \in T \mid d_i = d]}{Pr[T_i \in T \mid d_i = \text{null}]} \right| \leq \varepsilon.$$

Here, $d_i$=null refers to the case where the data element for client i is removed. In other words, an adversary having n−1 data points of a data set cannot reliably test whether the nth data point was a particular value. Thus, a differentially privatized dataset cannot be queried in a manner that enables the determination of any particular user's data.

In one embodiment, a privatized multibit histogram model can be implemented on the client device and the server, with an optional transition to a count-mean-sketch privatization technique when the universe of labels exceeds a threshold. The multibit histogram model can send p bits to a server, where p corresponds to size of the universe of data values corresponding with potential proposed labels. The server can perform a summation operation to determine a frequency of user data values. The multibit histogram model can provide an estimated frequency variance of $(c_\varepsilon^2-1)/4)n$, where n is the number of users and $$c_\varepsilon = \frac{e^\varepsilon + 1}{e^\varepsilon - 1}.$$

When the universe of data values corresponding with potential proposed labels exceeds a threshold, the server can use a count-mean-sketch differential privacy mechanism to estimate the frequency of proposed labels in a privatized manner.

FIGS. 5A-5C illustrate exemplary privatized data encodings that can be used in embodiments described herein that implement privatization via differential privacy. FIG. 5A illustrates proposed label encoding 500 on a client device. FIG. 5B illustrates a proposed label histogram 510 on a server. FIG. 5C illustrates proposed label frequency sketch 520 on a server.

As shown in FIG. 5A, in one embodiment a proposed label encoding 500 is created on a client device in which a proposed label value 502 is encoded into a proposed label vector 503. The proposed label vector 503 is a one-hot encoding in which a bit is set that corresponds with a value associated with a proposed label generated by a client device. In the illustrated proposed label encoding 500, the universe of labels 501 is the set of possible labels that can be proposed for an unlabeled unit of data provided to a client device by the server. The number of values in the universe of labels 501 is related to the machine-learning model that will be trained by the crowdsourced labeled data. For example, for a classifier that will be trained to infer a classification selected from a universe of p classifications, a universe size of p can be used for the universe of labels. However, such relationship is not required for all embodiments, and the size of the universe of labels is not fixed to any specific size. It should be noted that a vector is described herein for convenience and mathematical purposes, but any suitable data structure can be implemented, such as a string of bits, an object, etc.

As shown in FIG. 5B, in one embodiment the server can aggregate privatized proposed labels into a proposed label histogram 510. For each unit of unlabeled data, the server can aggregate the proposed labels 512 and count the number of proposals 511 for each of the proposed labels 512. The selected label 513 will be the proposed label with the greatest number of proposals 511.

As shown in FIG. 5C, in one embodiment the server can generate a proposed label frequency sketch 520 for use with a count-mean-sketch differential privacy algorithm. The server can accumulate privatized proposed labels from multiple different client devices. Each client device can transmit a privatized encoding of a proposed label along with an index value (or a reference to the index value) of a random variant used when privatizing the proposed label. The random variant is a randomly selected variation on a proposed label to be privatized. Variants can correspond to a set of k values (or k index values) that are known to the server. The accumulated proposed labels can be processed by the server to generate the proposed label frequency sketch 520. The frequency table can be indexed by the set of possible variant index values k. A row of the frequency table corresponding to the index value of the randomly selected variant is then updated with the privatized vector. More detailed operations of the multi-bit histogram and count-mean-sketch methods are further described below.

Figure 6A:
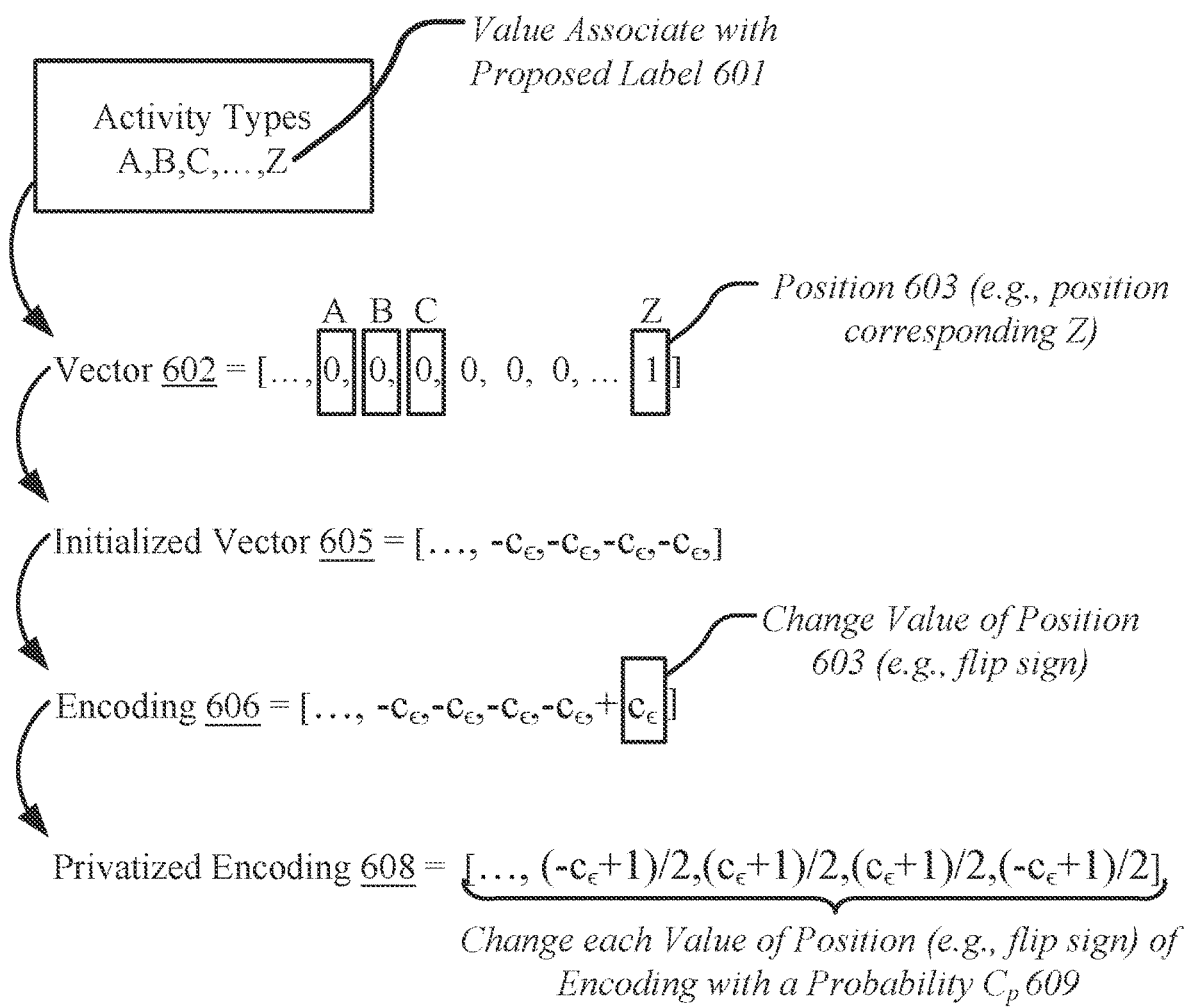
FIGS. 6A-6B are example processes for encoding and differentially privatizing proposed labels to be transmitted to a server, according to embodiments described herein.
Figure 6B:
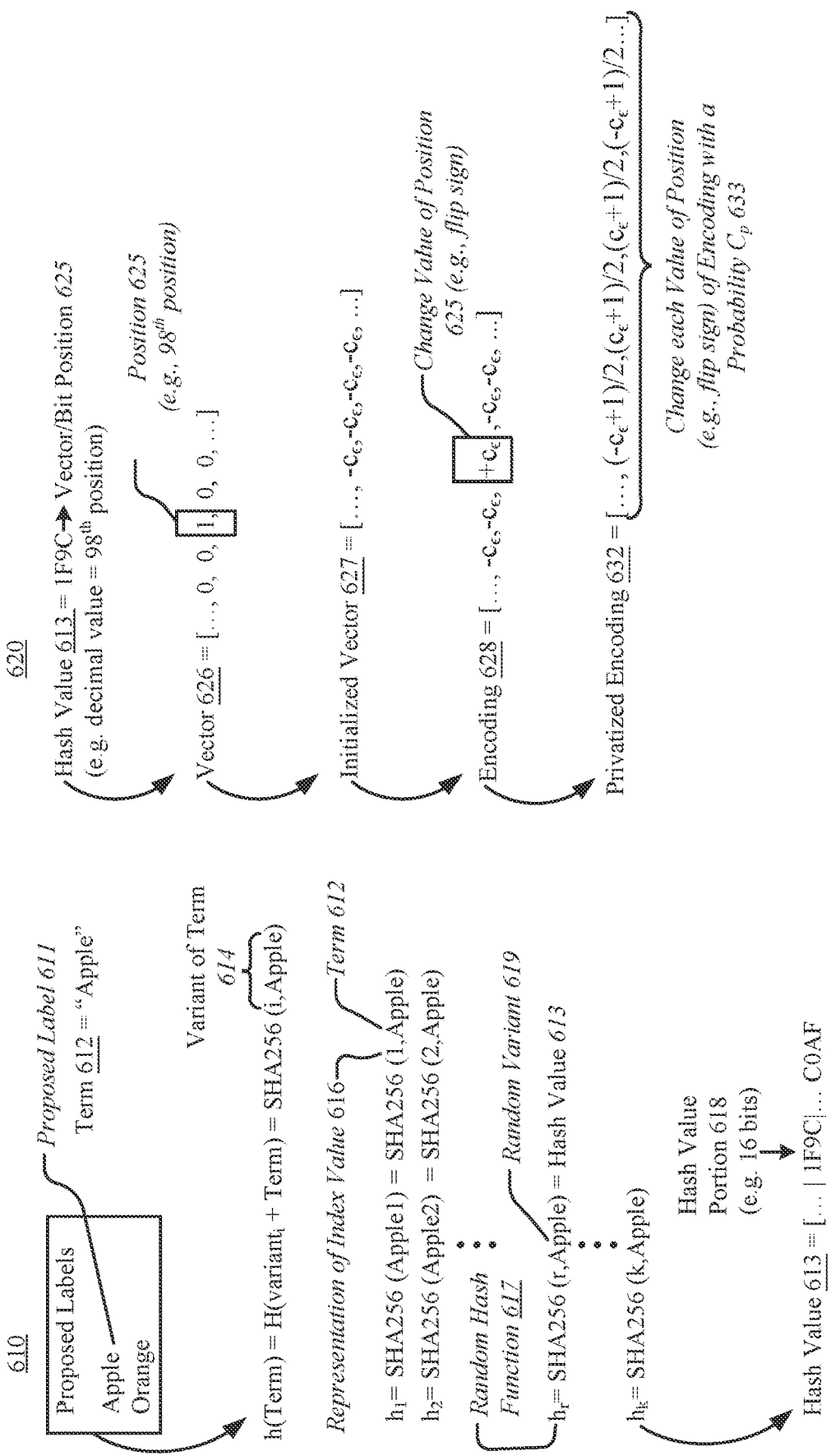

FIGS. 6A-6B are example processes 600, 610, 620 for encoding and differentially privatizing proposed labels to be transmitted to a server, according to embodiments described herein. In embodiments described herein, each client device that participates in crowdsourcing a label for a unit of server provided data can generate a proposed label for the unit of data and privatized the label before transmitting the label to the server. The proposed label can be a label within a universe of potential proposed labels, where a specific label value is associated with a proposed label selected by the client device.

In one embodiment, as shown in example process 600 of FIG. 6A, a specific value 601 is associated with a proposed label selected by the client device. The system can encode the label value 601 in the form of a vector 602, where each position of the vector corresponds with a proposed label. The label value 601 can correspond to a vector or bit position 603. For example, illustrated proposed label value Z corresponds to position 603 while potential proposed label values A and B correspond to different positions within the vector 602. The vector 602 can be encoded by updating the value (e.g., setting the bit to 1) at position 603. To account for any potential bias of a 0 or null value, the system may use an initialized vector 605. In one embodiment, the initialized vector 605 can be a vector $v \leftarrow \{-c_\geq\}^m$. It should be noted that the values are used as mathematical terms, but can be encoded using bits (e.g., $0=+c_\varepsilon$, $1=-c_\varepsilon$). Accordingly, vector 602 may use the initialized vector 605 to create an encoding 606 wherein the value (or bit) at position 603 is changed (or updated). For example, the sign of the value at position 603 can be flipped such that the value is $c_\varepsilon$ (or $+c_\varepsilon$) and all other values remain $-c_\varepsilon$ as shown (or vice versa).

The client device can then create a privatized encoding 608 by changing at least some of the values with a probability $C_p$ 609, which may be a pre-determined probability. In one embodiment, the system can change the values via a flip the sign (e.g., (−) to (+), or vice versa) of the value. In one embodiment, probability $C_p$ 609 is equal to $$\frac{e^\varepsilon}{e^\varepsilon + 1}.$$

Accordingly, the label value 601 is now represented as a privatized encoding 608, which individually maintains the privacy of the user that generated the proposed label. This privatized encoding 608 can be stored on the client device and subsequently transmitted to the server 130. The server 130 can accumulate privatized encodings (e.g., vectors) from various client devices. The accumulated encodings may then be processed by the server for frequency estimation. In one embodiment, the server may perform a summation operation to determine a sum of the value of user data. In one embodiment, summation operation includes performing a summation operation on vectors received by the client devices.

In one embodiment, as shown in example process 610 of FIG. 6B, is an example process flow of differentially privatizing an encoding of user data to be transmitted to a server according to an embodiment of the disclosure. A $A_{client}$ device can select a proposed label 611 to transmitted to the server. The proposed label 611 can be represented as a term 612 in any suitable format, where the term is a representation of the proposed label. In one embodiment, the term 612 can be converted to a numeric value using a hash function. As illustrated, a SHA256 hash function is used in one embodiment. However, any other hash function may also be used. For example, variants of SHA or other algorithms may be used such as SHA1, SHA2, SHA3, MD5, Blake2, etc. with various bit sizes. Accordingly, any hash function may be used in implementations given they are known to both the client and server. In one embodiment, a block cipher or another cryptographic function that is known to the client and server can also be used.

In one embodiment, computational logic on a client device can use a portion of a created hash value along with a variant 614 of the term 612 to address potential hash collisions when performing a frequency count by the server, which increases computational efficiency while maintaining a provable level of privacy. Variants 614 can correspond to a set of k values (or k index values) that are known to the server. In one embodiment, to create a variant 614, the system can append a representation of an index value 616 to the term 612. As shown in this example, an integer corresponding to the index value (e.g., "1,") may be appended to the term 612 to create a variant (e.g., "1,Apple", or "Apple1", etc.). The system can then randomly select a variant 619 (e.g., variant at random index value r). Thus, the system can generate a random hash function 617 by using a variant 614 (e.g., random variant 619) of the term 612. The use of variants enables the creation of a family of k hash functions. This family of hash functions is known to the server and the system can use the randomly selected hash function 617 to create a hash value 613. In one embodiment, in order to reduce computations, the system may only create the hash value 613 of the randomly selected variant 619. Alternatively, the system may create a complete set of hash values (e.g., k hash values), or hash values up to the randomly selected variant r. It should be noted that a sequence of integers is shown as an example of index values, but other forms of representations (e.g., various number of character values) or functions (e.g., another hash function) may also be used as index values given that they are known to both the client and server.

Once a hash value 613 is generated, the system may select a portion 618 of the hash value 613. In this example, a 16-bit portion may be selected, although other sizes are also contemplated based on a desired level of accuracy or computational cost of the differential privacy algorithm (e.g., 8, 16, 32, 64, etc. number of bits). For example, increasing the number of bits (or m) increases the computational (and transmission) costs, but an improvement in accuracy may be gained. For instance, using 16 bits provides $2^{16}-1$ (e.g., approximately 65k) potential unique values (or m range of values). Similarly, increasing the value of the variants k, increases the computational costs (e.g., cost to compute a sketch), but in turn increases the accuracy of estimations. In one embodiment, the system can encode the value into a vector, as in FIG. 6A, where each position of the vector can correspond to a potential numerical value of the created hash value 613.

For example, process flow 620 of FIG. 6B illustrates that the created hash value 613, as a decimal number, can be correspond to a vector/bit position 625. Accordingly, a vector 626 may be encoded by updating the value (e.g., setting the bit to 1) at position 625. To account for any potential bias of a 0 or null value, the system may use an initialized vector 627. In one embodiment, the initialized vector 627 may be a vector $v \leftarrow \{-c_\varepsilon\}^m$. It should be noted that the values are used as mathematical terms, but may be encoded using bits (e.g., 0=+$c_\varepsilon$, 1=−$c_\varepsilon$). Accordingly, vector 626 may use the initialized vector 627 to create an encoding 628 wherein the value (or bit) at position 625 is changed (or updated). For example, the sign of the value at position 625 may be flipped such that the value is $c_\varepsilon$ (or +$c_\varepsilon$) and all other values remain −$c_\varepsilon$ as shown (or vice versa).

The system can then create a privatized encoding 632 by changing at least some of the values with a probability $C_p$ 633, where $$C_p = \frac{e^\varepsilon}{e^\varepsilon + 1}.$$

In one embodiment, the system can change a value by flipping the sign (e.g., (−) to (+), or vice versa) of the value. Accordingly, the proposed label 611 is now represented as a privatized encoding 632, which individually maintains the privacy of the user when the privatized encoding 632 of the proposed label 611 is aggregated by the server.

Figure 7A:
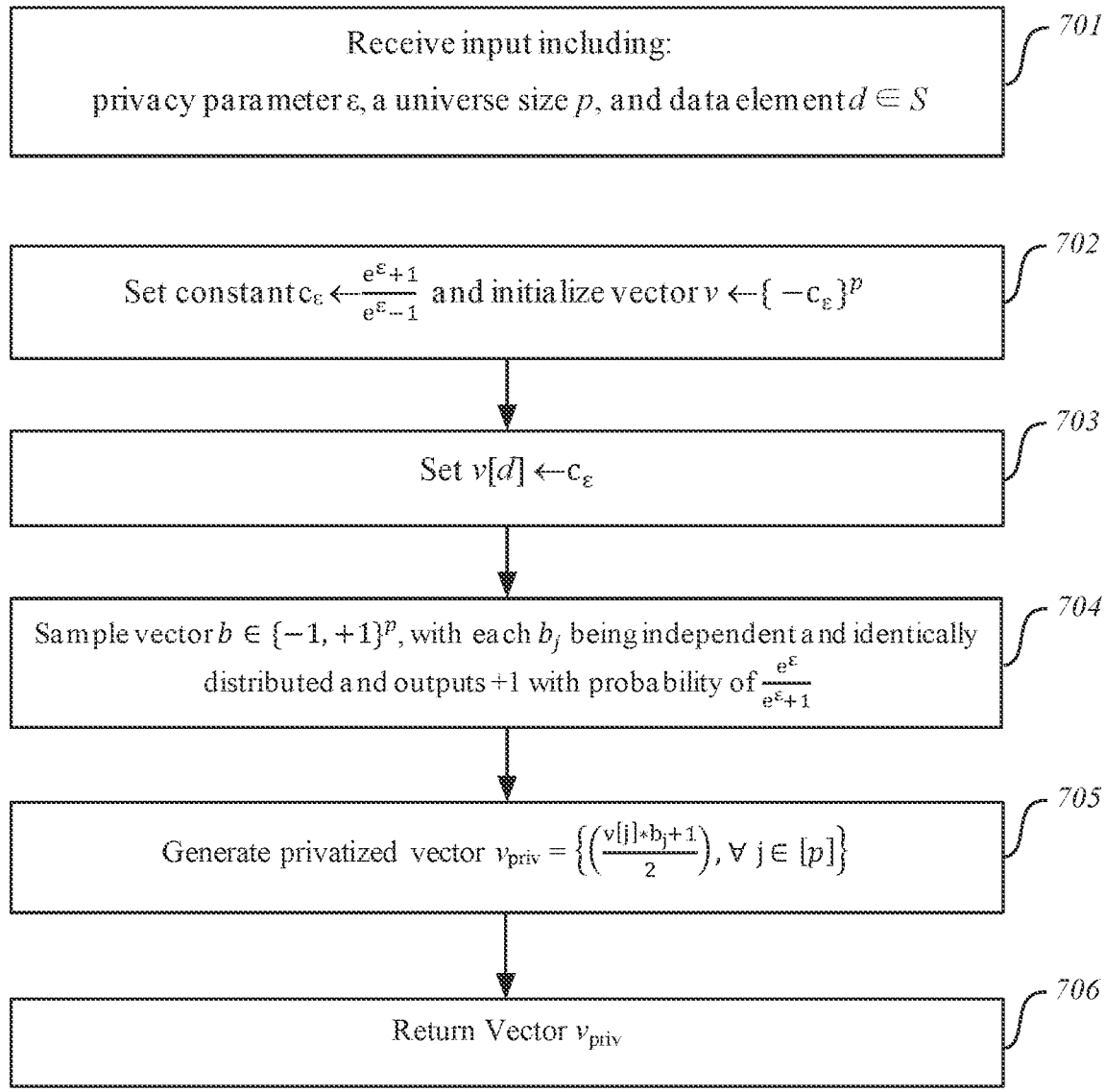
FIGS. 7A-7D are block diagrams of multibit histogram and count-mean-sketch models of client and server algorithms according to an embodiment.
Figure 7B:
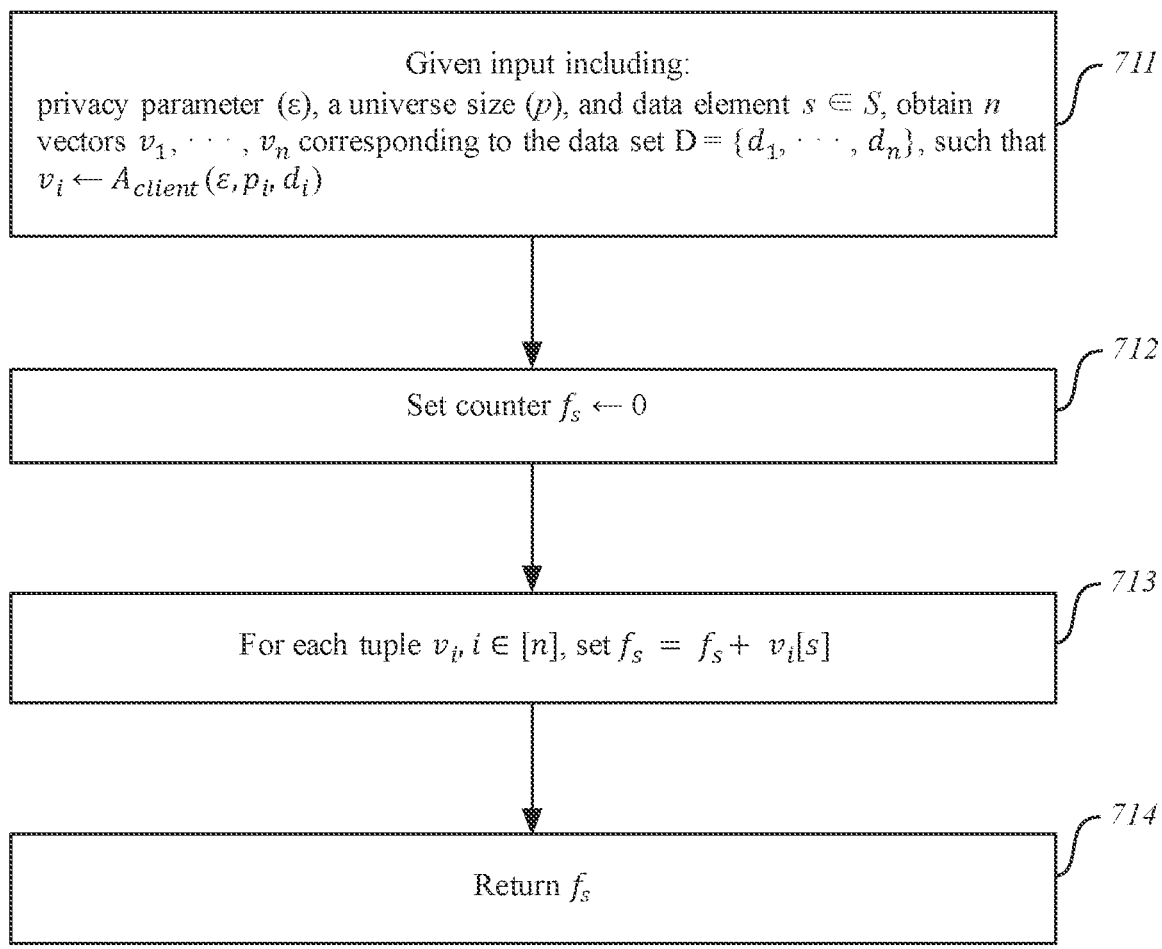
Figure 7C:
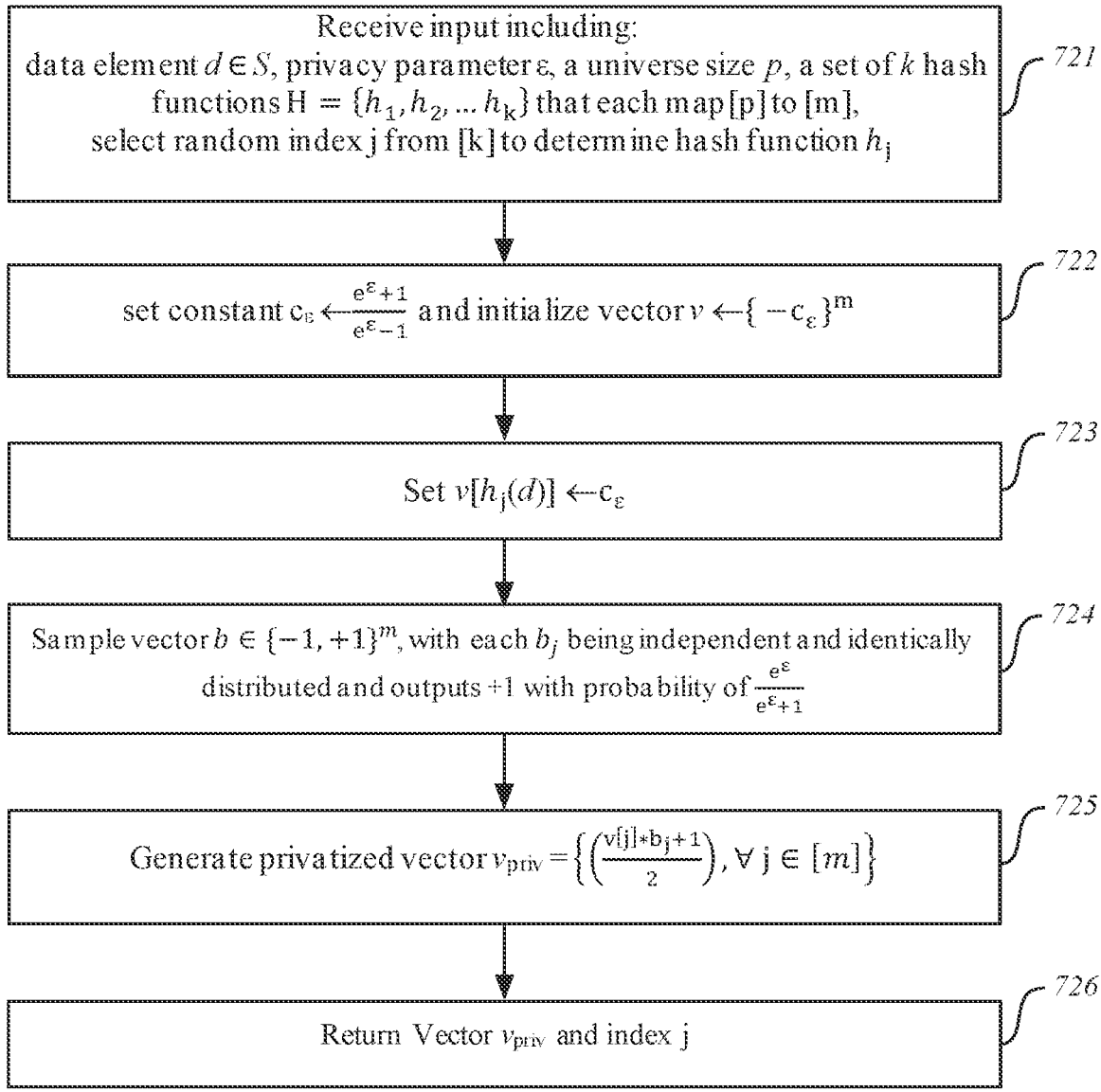
Figure 7D:
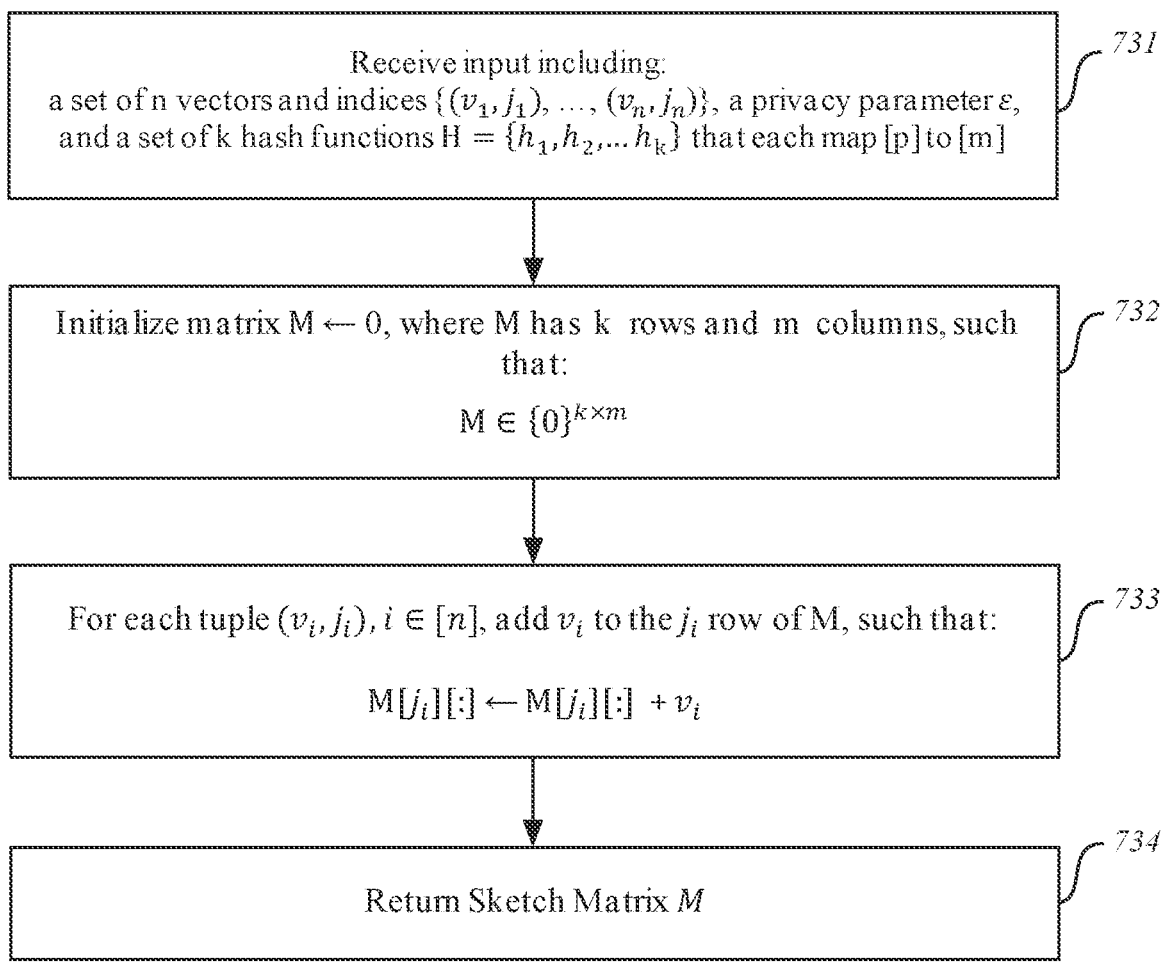

FIGS. 7A-7D are block diagrams of multibit histogram and count-mean-sketch models of client and server algorithms according to an embodiment. FIG. 7A shows an algorithmic representation of the client-side process 700 of the multibit histogram model as described herein. FIG. 7B shows an algorithmic representation of the server-side process 710 of the multibit histogram model as described herein. FIG. 7C shows an algorithmic representation of a client-side process 720 of a count-mean-sketch model as described herein. FIG. 7D shows an algorithmic representation of a server-side process 730 of a count-mean-sketch model as described herein. The client-side process 700 and server-side process 710 can use the multibit histogram model to enable privacy of crowdsourced data while maintaining the utility of the data. Client-side process 700 can initialize vector $v \leftarrow \{-c_\varepsilon\}^m$. Where the user is to transmit $d \in [p]$, client-side process 700 can be applied to flip the sign of v[h(d)], where h is a random hash function. To ensure differential privacy, client-side process 700 can flip the sign of each entry v with a probability of $$\frac{e^\varepsilon}{e^\varepsilon + 1}.$$

The client-side process 720 can also use hash functions to compress frequency data for when the universe of proposed labels exceeds a threshold.

As shown FIG. 7A, client-side process 700 can receive input including a privacy parameter ε, a universe size p, and data element $d \in S$, as shown at block 701. At block 702, client-side process 700 can set a constant $$c_\varepsilon \leftarrow \frac{e^\varepsilon + 1}{e^\varepsilon - 1}$$

and initialize vector $v \leftarrow \{-c\}^p$, as shown in block 702. Constant $c_\varepsilon$ allows noise added to maintain privacy and remain unbiased. Added noise should be large enough to mask individual items of user data, but small enough to allow any patterns in the dataset to appear. As shown at block 703 client-side process 700 can then set $v[d] \leftarrow c_\varepsilon$ and, at block 704, sample vector $b \in \{-1, +1\}^p$, with each $b_j$ being independent and identically distributed and outputs+1 with probability $$\frac{e^\varepsilon}{e^\varepsilon + 1}.$$

As shown at block 705, client-side process 700 can then generate a privatized vector $$v_{priv} = \left\{ \left( \frac{v[j] * b_j + 1}{2} \right), \forall j \in [p] \right\}.$$

At block 706, client-side algorithm 700 can return vector $v_{priv}$, which is a privatized version of vector v.

As shown in FIG. 7B, server-side process 710 aggregates the client-side vectors and, given input including privacy parameter ε, universe size p, and data element s∈ S, whose frequency is to be estimated, can return an estimated frequency based on aggregated data received from crowdsourcing client devices. As shown at block 711, server-side process 710 (e.g., $A_{server}$), given privacy parameter ε and a universe size p, can obtain n vectors $v_1, \ldots, v_n$ corresponding to the data set D={$d_1, \ldots, d_n$}, such that $v_i \leftarrow A_{client}$ (ε, p, $d_i$). At block 712, server-side process 710 can initialize a counter $f_s$ (e.g., $f_s \leftarrow 0$). Server-side process 710, for each tuple $v_i$, i∈ [n], can set $f_s = f_s + v_i[s]$, as shown at block 713. At block 714, server-side process 710 can return $f_s$, which is a frequency of the value of user data amongst the aggregate data set.

Client-side process 700 and server-side process 710 provide privacy and utility. Client-side process 700 and server-side process 710 are jointly locally differentially private. Client-side process 700 is ε-locally differentially private and server-side process 710 only accesses the privatized data. For arbitrary output $v \in \{-c_\varepsilon, c_\varepsilon\}^p$, the probability of observing the output is similar whether the user is present or not. For example, in the case of an absent user, the output of $A_{client}$ (ε, p, h, φ) can be considered, where φ is the null element. By the independence of each bit flip, $$\frac{Pr[A_{client}(\varepsilon, p, h, d) = v]}{Pr[A_{client}(\varepsilon, p, h, \varphi) = v]} \le e^\varepsilon$$

Similarly, $$\frac{Pr[A_{client}(\varepsilon, p, h, d) = v]}{Pr[A_{client}(\varepsilon, p, h, \varphi) = v]} \ge e^{-\varepsilon}$$

Server-side process 710 also has a utility guarantee for frequency estimation. Privacy and utility are generally tradeoffs for differential privacy algorithms. For a differential privacy algorithm to achieve maximal privacy, the output of the algorithm may not be a useful approximation of the actual data. For the algorithm to achieve maximal utility, the output may not be sufficiently private. The multibit histogram model described herein achieves ε-local differential privacy while achieving optimal utility asymptotically.

The overall concepts for the count-mean-sketch algorithm are similar to those of multi-bit histogram, excepting that data to be transferred is compressed when the universe size p becomes very large. The server can use a sketch matrix M of dimension k×m to aggregate the privatized data.

As shown FIG. 7C, a client-side process 720 can receive input including a data element d∈ S, a privacy parameter ε, a universe size p, and a set of k hash functions H={$h_1, h_2, \ldots h_k$} that each map [p] to [m], can select random index j from [k] to determine hash function $h_j$, as shown at block 721. Client-side process 720 can then set a constant $$c_\varepsilon \leftarrow \frac{e^\varepsilon + 1}{e^\varepsilon - 1}$$

and initialize vector $v \leftarrow \{-c_\varepsilon\}^m$, as shown in block 722. Constant $c_\varepsilon$ allows noise added to maintain privacy and remain unbiased. Added noise should be large enough to mask individual items of user data, but small enough to allow any patterns in the dataset to appear.

As shown at block 723 client-side process 720 can use randomly selected hash function $h_j$ to set $v[h_j(d)] \leftarrow c_\varepsilon$. At block 724, client-side process 720 can sample vector b∈ $\{-1, +1\}^m$, with each $b_j$ being independent and identically distributed and outputs +1 with probability $$\frac{e^\varepsilon}{e^\varepsilon + 1}.$$

As shown at block 725, client-side process 720 can then generate a privatized vector $$v_{priv} = \left\{ \left( \frac{v[j] * b_j + 1}{2} \right), \forall j \in [m] \right\}.$$

At block 726, client-side process 720 can return vector $v_{priv}$, which is a privatized version of vector v, and randomly selected index j.

As shown in FIG. 7D, a server-side process 730 can aggregate client-side vectors and from client-side process 720. Server-side process 730 can receive input including a set of n vectors and indices {$(v_1, j_1), \ldots, (v_n, j_n)$}, a privacy parameter ε, and a set of k hash functions H={$h_1, h_2, \ldots h_k$} that each map [p] to [m], as shown at block 731. Server-side process 730 can then initialize matrix M←0, where M has k rows and m columns, such that M∈ $\{0\}^{k \times m}$, as shown at block 732. As shown at block 733, for each tuple $(v_i, j_i)$, i∈ [n], server-side process 730 can add $v_i$ to the $j_i$ row of M, such that $M[j_i][:] \leftarrow M[j_i][:] + v_i$. At block 734, the server-side process 730 can return sketch matrix M. Given the sketch matrix M, it is possible to estimate the count for entry d∈ S by de-biasing the counts and averaging over the corresponding hash entries in M.

While specific examples of proposed label privatization via multibit histogram and/or count-mean-sketch differential privacy techniques are described above, embodiments are not limited to any specific differential privacy algorithm for implementing privacy of the crowdsourced labels. Embodiments can be configured to use any local differential privacy algorithm that enables the privatized estimation of aggregate frequency data from multiple sources, while masking the contributor of each individual element of data to the data set. Additionally, the privacy techniques are not explicitly limited to the user of differential privacy algorithms. As described herein, homomorphic encryption techniques can be applied, such that encrypted values received from client devices can be summed on the server without revealing the privatized data to the server. For example, the client devices can employ a homomorphic encryption algorithm to encrypt proposed labels and send the proposed labels to the server. The server can then perform a homomorphic addition operation to sum the encrypted proposed labels without requiring the knowledge of the unencrypted proposed labels. In one embodiment, secure multi-party computation techniques can also be applied, such that the client device and the server can jointly compute aggregated values for the proposed labels without exposing the user data directly to the sever.

Figure 8:
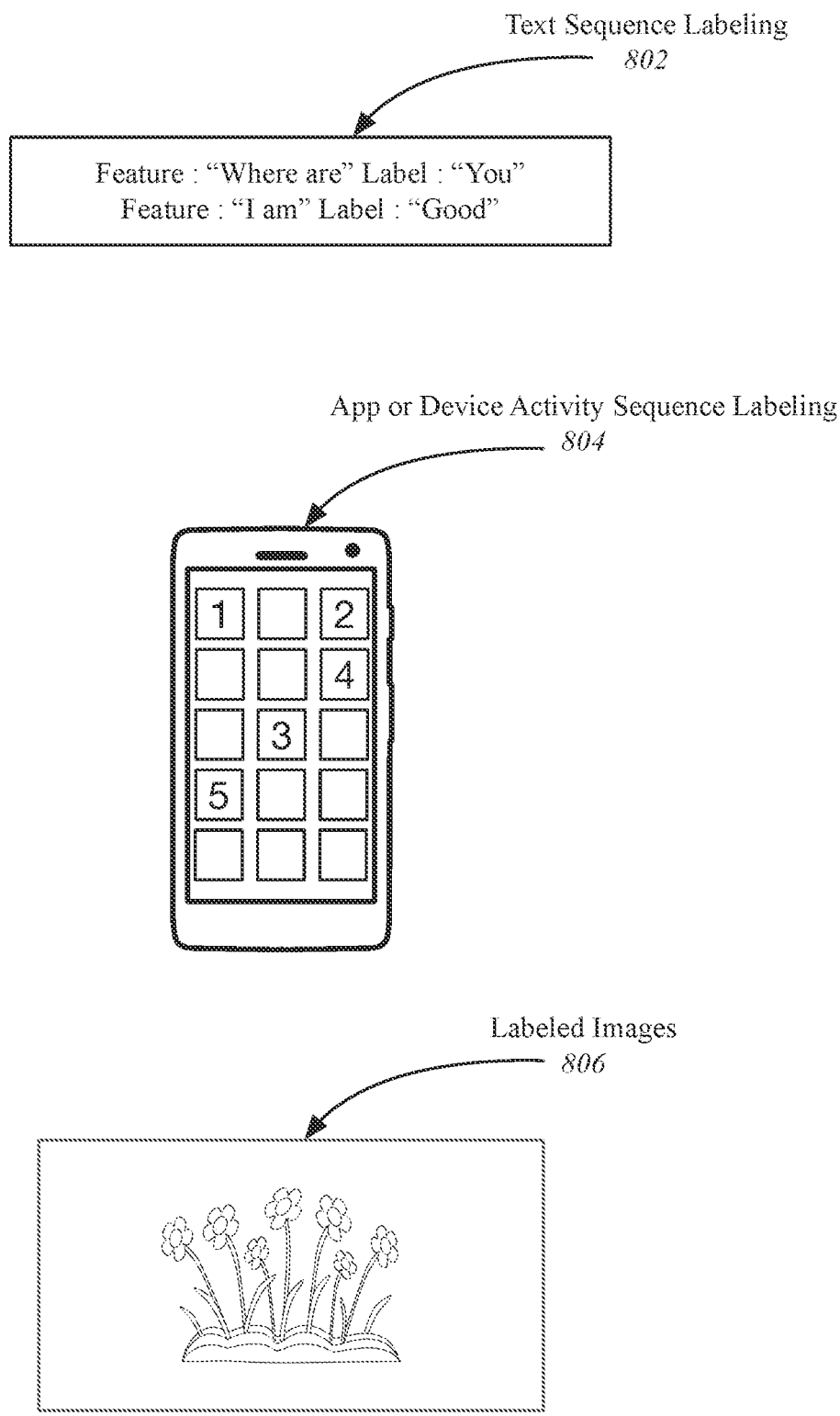
FIG. 8 illustrates data that can be labeled in a privatized manner, according to embodiments.

FIG. 8 illustrates data that can be labeled in a privatized manner, according to embodiments. The machine learning module 361 of FIG. 3A includes a machine learning model that can be trained using a variety of different types of data on the client device 310.

In one embodiment, text data can be used to generate training data to train a machine learning model on the client device to perform text sequence labeling 802. Training to generate labels for sequential text data can be performed by dividing text sequences on the client device into features and labels and training a local machine learning model on the features and labels. For example, "Where are you" can be divided into a feature ("Where are") and a label ("you"). "I am good" can be divided into the feature ("I am") and the label ("good"). This data can be used to train machine learning models within machine learning modules on each client device, resulting in machine learning models that are individualized for each device based on the local data on the device. Proposed labels can then be generated for unlabeled data sent to the client devices from the server.

In one embodiment, activity sequences 804 can be labeled, such as but not limited to application launch sequences, application activity sequences, device activity sequences, or combinations of application and device activities. Application or device activity sequences recognized by the device can be used to train a machine learning model in the client device in a similar manner as text sequence labeling. For example, a sequence of regular device activities including connecting to a power source, connecting to a Bluetooth device, leaving from or arriving to a specific location, or launching a specific application, can be analyzed to determine a set of regular activities performed on or with the mobile electronic device. Activities that are regularly performed in a specific sequence can be classified as sequence features having a label that enables prediction of the next activity in the sequence.

In one embodiment, labeled images 806 on a client device can also be used to train a machine learning model on a client device. For example, images or photographs stored or associated with a client device that have been labeled in some manner can be used to train a machine learning model on the client device. In one embodiment, relevant labels are general descriptions associated with images (e.g., flowers, sunset, etc.). In one embodiment the labels can be applied to the images by a user or automatically via automated image labeling or captioning logic provided by an image or photo management program.

Figure 9A:
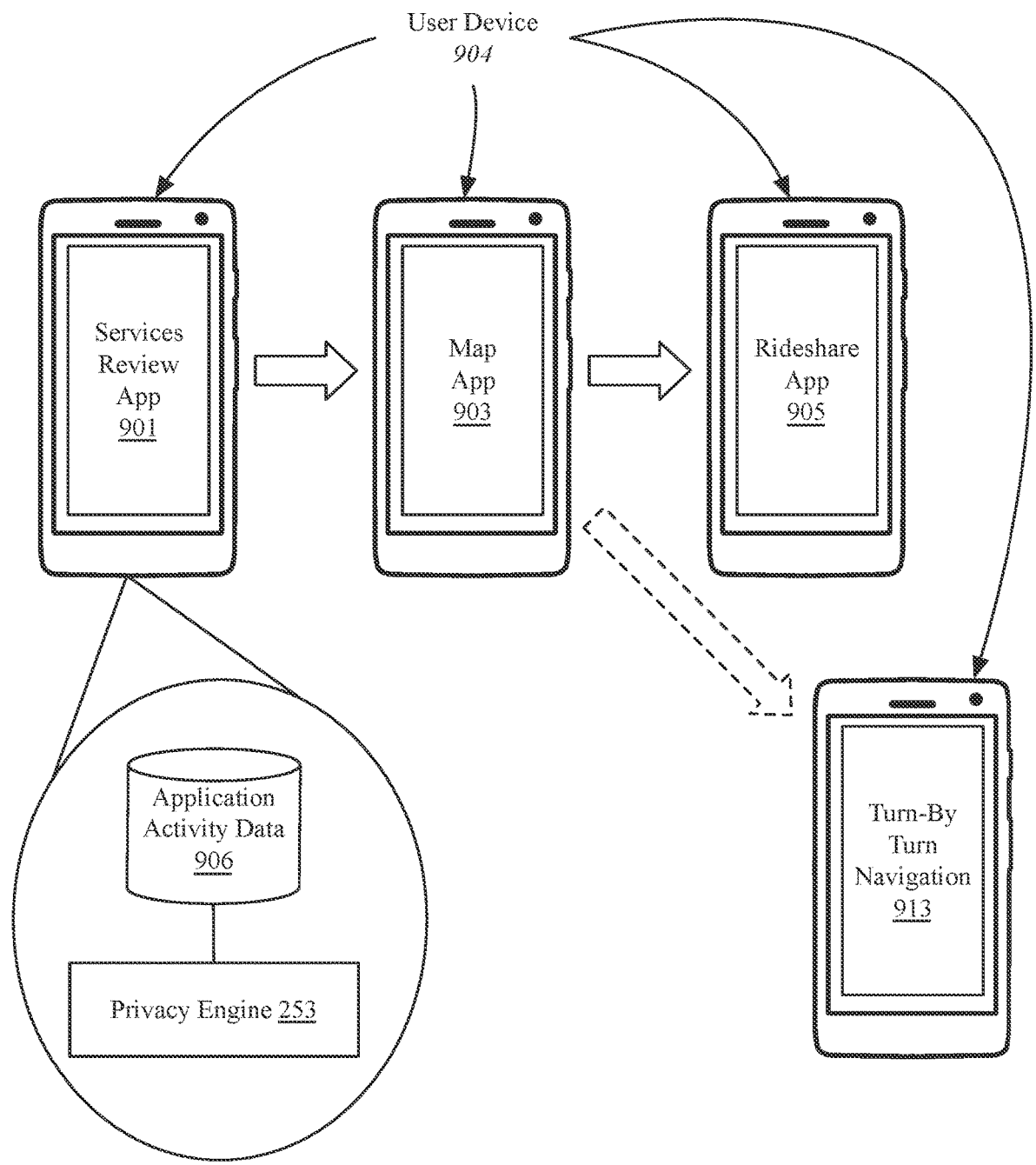
FIG. 9A illustrates device activity sequences that can be learned in a privatized manner, according to an embodiment.

FIG. 9A illustrates device activity sequences that can be learned in a privatized manner, according to an embodiment. A user device 904 is illustrated, where the user device 904 can be a variant of any form of user device described herein, including, for example, client device 310 as described herein. User device 904 can include a machine learning module such as the machine learning module 361 of client device 310. The user device 904 can execute a variety of functions on behalf of a user, including functions performed by one or more applications executing on the user device 904. In one embodiment, application activity data 906 can be stored by the user device 904 that records at least a subset of application launches or in-app activities. Applications and activities within the application activity data 906 can be assigned numerical values. The numerical values associated with the applications and activities performed by the user device 904 can be encoded as data sequences that can be used to train a machine learning model of a machine learning module on the user device 904. The trained machine learning model can be used to train unlabeled sequences provided by a server.

In one embodiment the launching of the services review application 901 can be detected and stored in the application activity data 906. In one embodiment the user device 904 can store at least a subset of in-app activity within the application activity data 906. For example, the services review application 901 can optionally donate in-application activity to the application activity data 906 and/or searches performed within the services review application 901. In one embodiment, the user device 904 can detect a subset of in-app activity performed on the user device 904. As an example of the activities described above, a user can launch a services review application 901 that provides user reviews of service or goods providers (e.g., restaurants, retail stores, repair shops, etc.). The user device 904 can launch the services review application 901 in response to receipt of a graphical interface request or a virtual assistant request. The user can perform a search for a service or goods provider, for example via the graphical interface or voice interface of the user device 904. The user device 904 can then display reviews of one or more providers. The user can then launch a map application 903 on the user device, for example, to enable the user to determine a location of one or more service or goods providers. The user can then launch a rideshare application 905 on the user device 904. The rideshare application 905, can be separate from or associated with the map application 903. Alternatively, the user can direct the user device 904 to enable turn-by-navigation 913, which can be a feature of the map application 903 or a feature provided by a separate map or navigation application.

In one embodiment, each of the application launches and/or application activities can be encoded as a numerical sequence within the application activity data 906. The numerical sequence can be divided into feature and label portions. The feature and label portions can be used to train the machine learning model. The trained machine learning model can then propose labels for unlabeled sequences provided by the server. A proposed label can be selected and privatized by a privacy engine on a client device using a privacy preserving encoding technique described herein. The privatized label can then be transmitted to the server. Embodiments are not limited to the specific examples shown. Additional application activity sequences that can be learned include purchase sequences within an online application or media store (e.g., app store) or in-app purchase sequences within an application.

Figure 9B:
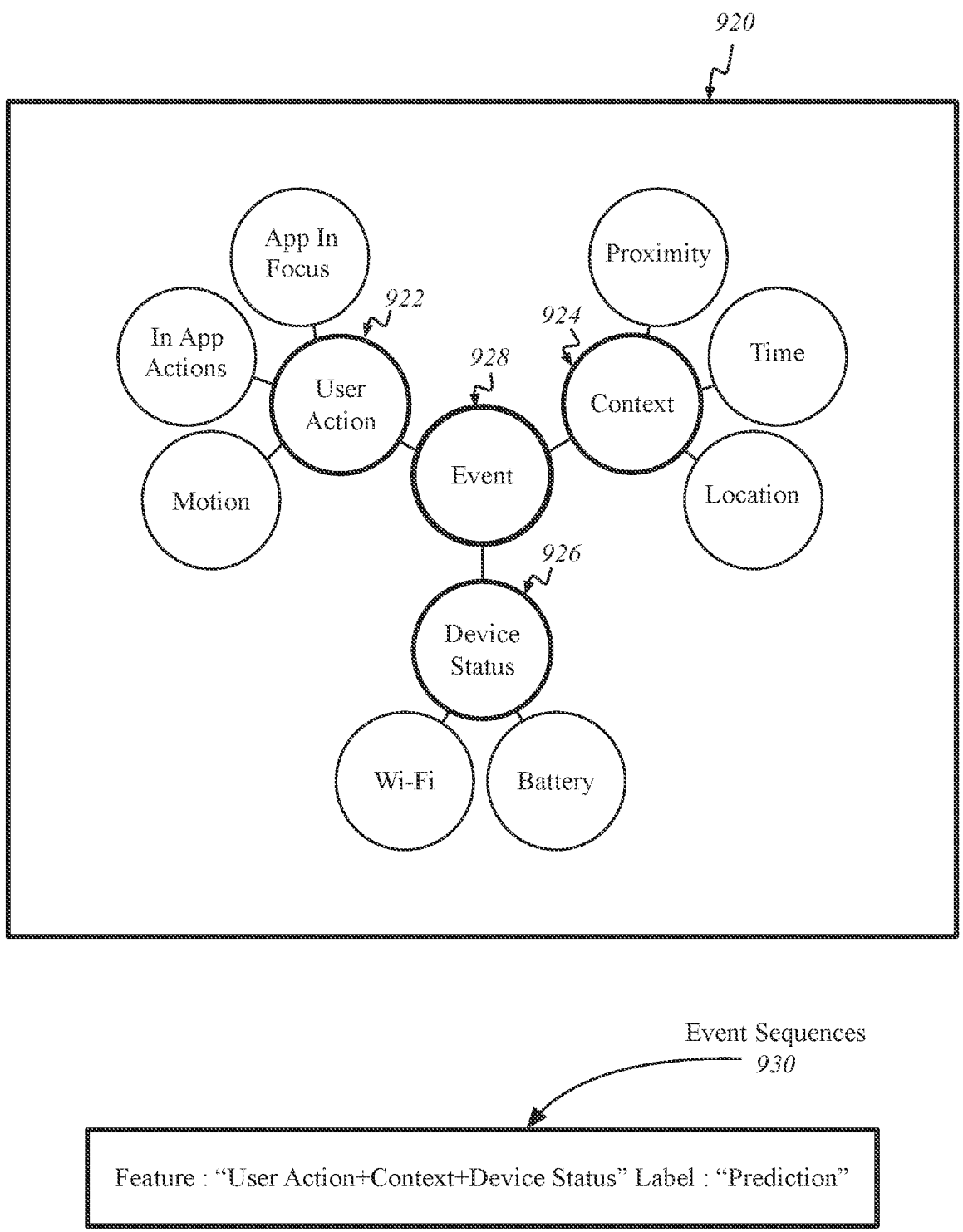
FIG. 9B illustrates exemplary device activity that can be used to train a predictor model on a client device.

FIG. 9B illustrates device activity 920 that can be used to train a predictor model on a client device. As shown in FIG. 9B, a variety of device activity 920 can be sampled and used to train predictive models for application and/or device activities. Event data 928 can be gathered from multiple devices for a user and combined into aggregated user data. Event data 928 can be gathered from a variety of user devices, including wearable electronic devices, mobile devices such as smartphones and tablet computing devices, laptop computing devices, and desktop computing devices. Event data 928 includes but is not limited to user action data 922, context data 924, and device status data 926.

User action data 922 includes, for example, device motion data, in app actions, and app in focus data. Motion data can include raw accelerometer data for the device as well as processed accelerometer data that indicates information such as a number of steps taken by a user, distance travelled, exercise data, flights of stairs taken, standing versus sitting metrics, and the like. In app actions include activity performed within an application, such as purchases made in an online app store or media store, in-app purchases made within an application, websites visited by a web browser, photographs taken by a camera application, and other user actions within a given application. App in focus data includes information about which applications are active and the duration which the user makes use of those applications.

Context data 924 includes context information associated with other event data 928, such as user actions 922 or device status 926. For example, for each user action 922, context data 924 can be gathered to provide additional information about those actions. For example, if a user regularly runs for exercise, the time and location of those runs can be recorded as context data 924 by the active device of the user during the run. During the run, proximity information can also be recorded, such as proximity of the active device to devices of other users or to geographic points of interest for the user.

Event data 928 can also include device status 926, such as Wi-Fi device status, including signal strength analysis and available access points to the device. Device status 926 can also include battery information including current and historical battery energy level, charge status, and the percentage of battery usage that is devoted to particular activities or applications.

The various elements of event data 928 and other types of device activity 920 can be converted into event sequences 930 and partitioned into feature and element data. In one embodiment, feature data can include a user action, a context, and an associated device status. The label can be a prediction that would be made based on the combination of action, context and status. The feature and element data can be added training data that is used to train machine learning models on the client device. The machine learning models can then generate proposed labels for unlabeled server data, which can then be used to train a predictive model on the server device.

Figure 10:
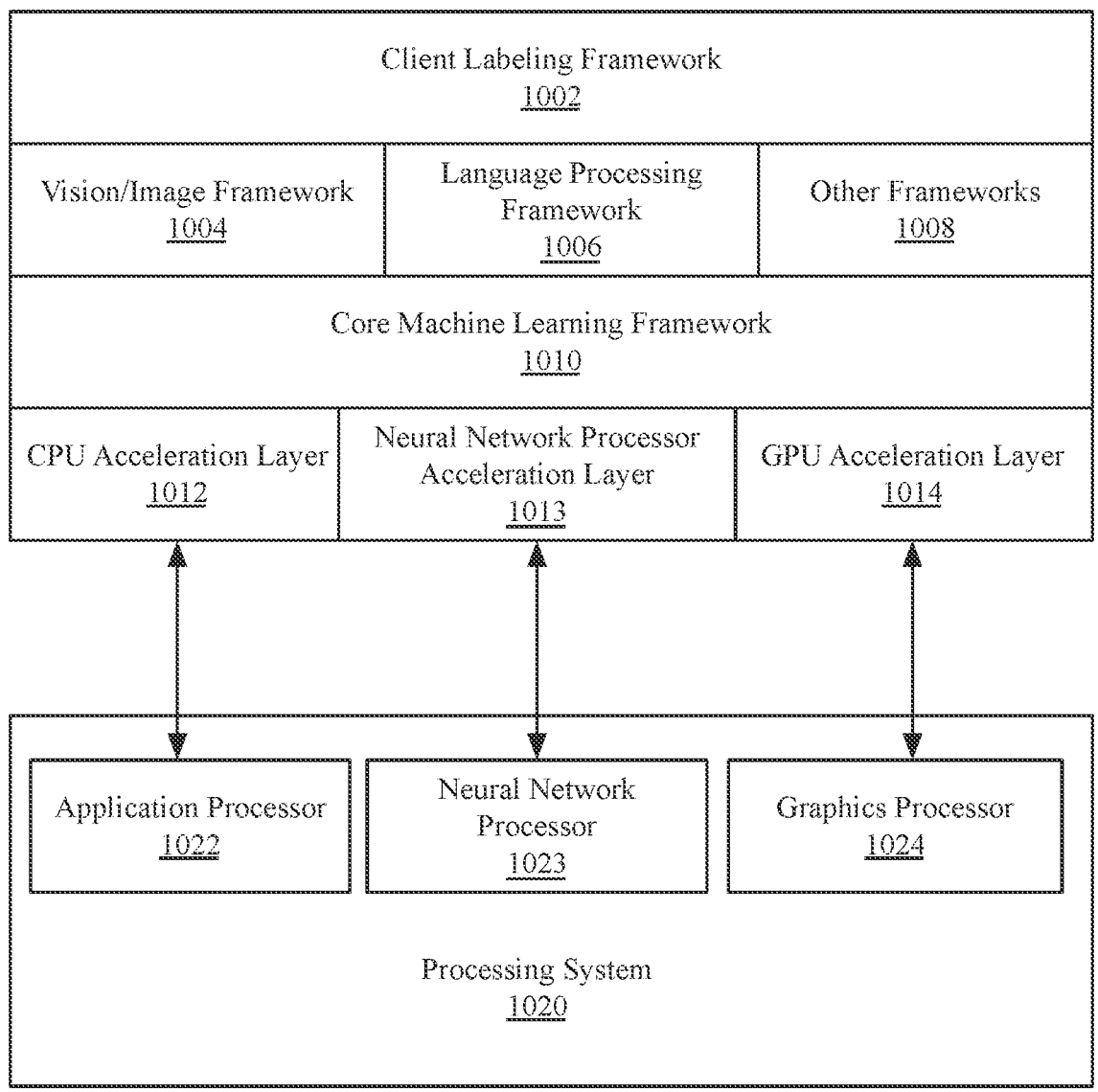
FIG. 10 illustrates compute architecture on a client device that can be used to enable on-device, semi-supervised training and inferencing using machine learning algorithms, according to embodiments described herein.

FIG. 10 illustrates compute architecture 1000 on a client device that can be used to enable on-device supervised training and inferencing using machine learning algorithms, according to embodiments described herein. In one embodiment, compute architecture 1000 includes a client labeling framework 1002 that can be configured to leverage a processing system 1020 on a client device. The client labeling framework 1002 includes a vision/image framework 1004, a language processing framework 1006, and one or more other frameworks 1008, which each can reference primitives provided by a core machine learning framework 1010. The core machine learning framework 1010 can access resources provided via a CPU acceleration layer 1012, neural network processor acceleration layer 1013 and a GPU acceleration layer 1014. The CPU acceleration layer 1012, neural network processor acceleration layer 1013, and the GPU acceleration layer 1014 each facilitate access to a processing system 1020 on the various client devices described herein. The processing system includes an application processor 1022, a neural network processor 1023, and a graphics processor 1024, each of which can be used to accelerate operations of the core machine learning framework 1010 and the various higher-level frameworks that operate via primitives provided via the core machine learning framework. The application processor 1022 and graphics processor 1024 include hardware that can be used to perform general-purpose processing and graphics specific processing for the core machine learning framework 1010. The neural network processor 1023 includes hardware that is tuned specifically to accelerate processing operations for artificial neural networks. The neural network processor 1023 can increase speed at which neural network operations are performed, but is not required to enable the operation of the client labeling framework 1002. Labeling operations can be performed using the application processor 1022 and/or the graphics processor 1024.

In one embodiment, the various frameworks and hardware resources of the compute architecture 1000 can be used for inferencing operations via a machine learning model, as well as training operations for a machine learning model. For example, a client device can use the compute architecture 1000 to perform supervised learning via a machine learning model as described herein, such as but not limited to a CNN, RNN, or LSTM model. The client device can then use the trained machine learning model to infer proposed labels for a unit of unlabeled data provided by a server.

Additional Exemplary Computing Devices

Figure 11:
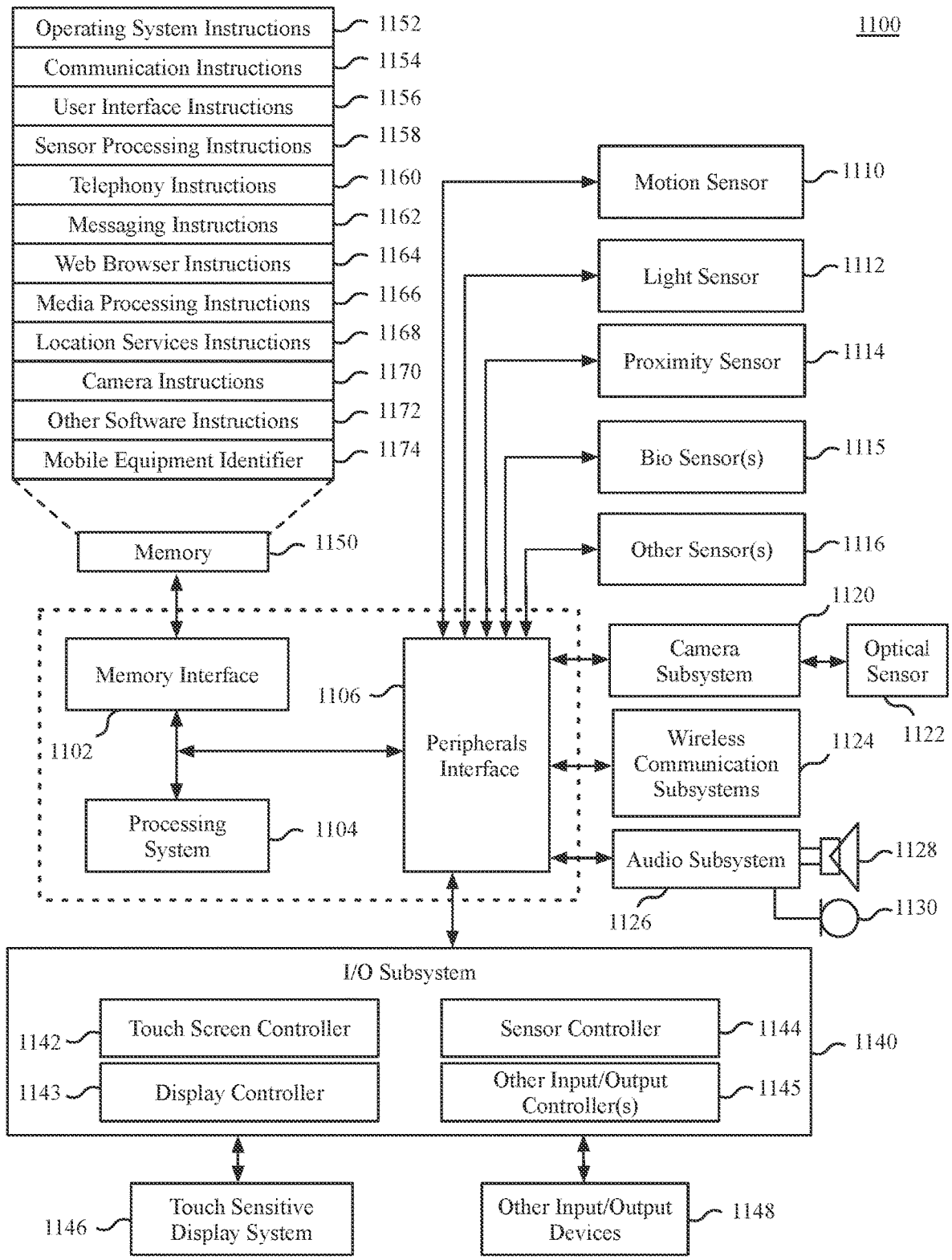
FIG. 11 is a block diagram of mobile device architecture, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment, the display controller 1143 can provide frame data to the touch sensitive display system 1146 at a variable frame rate.

In one embodiment, a sensor controller 1144 is included to monitor, control, and/or processes data received from one or more of the motion sensor 1110, light sensor 1112, proximity sensor 1114, or other sensors 1116. The sensor controller 1144 can include logic to interpret sensor data to determine the occurrence of one of more motion events or activities by analysis of the sensor data from the sensors.

In one embodiment, the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
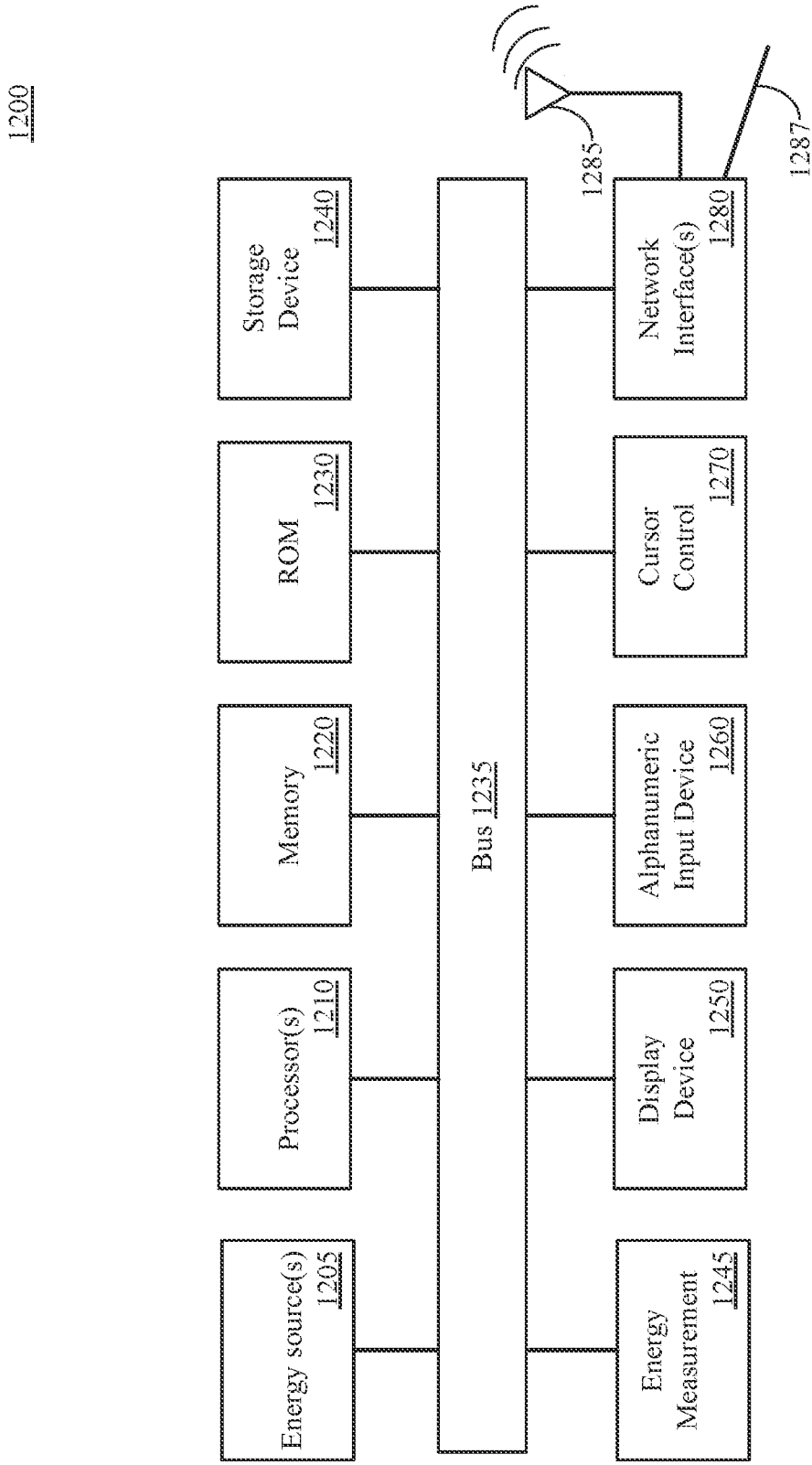
FIG. 12 is a block diagram illustrating an example computing system that can be used in conjunction with one or more of the embodiments of the disclosure.

FIG. 12 is a block diagram of a computing system 1200, according to an embodiment. The illustrated computing system 1200 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1200 can be used to provide the computing device and/or a server device to which the computing device may connect.

The computing system 1200 includes bus 1235 or other communication device to communicate information, and processor(s) 1210 coupled to bus 1235 that may process information. While the computing system 1200 is illustrated with a single processor, the computing system 1200 may include multiple processors and/or co-processors. The computing system 1200 further may include memory 1220, such as random access memory (RAM) or other dynamic storage device coupled to the bus 1235. The memory 1220 may store information and instructions that may be executed by processor(s) 1210. The memory 1220 may also be used to store temporary variables or other intermediate information during execution of instructions by the processor(s) 1210.

The computing system 1200 may also include read only memory (ROM) 1230 and/or another data storage device 1240 coupled to the bus 1235 that may store information and instructions for the processor(s) 1210. The data storage device 1240 can be or include a variety of storage devices, such as a flash memory device, a magnetic disk, or an optical disc and may be coupled to computing system 1200 via the bus 1235 or via a remote peripheral interface.

The computing system 1200 may also be coupled, via the bus 1235, to a display device 1250 to display information to a user. The computing system 1200 can also include an alphanumeric input device 1260, including alphanumeric and other keys, which may be coupled to bus 1235 to communicate information and command selections to processor(s) 1210. Another type of user input device includes a cursor control 1270 device, such as a touchpad, a mouse, a trackball, or cursor direction keys to communicate direction information and command selections to processor(s) 1210 and to control cursor movement on the display device 1250. The computing system 1200 may also receive user input from a remote device that is communicatively coupled via one or more network interface(s) 1280.

The computing system 1200 further may include one or more network interface(s) 1280 to provide access to a network, such as a local area network. The network interface(s) 1280 may include, for example, a wireless network interface having antenna 1285, which may represent one or more antenna(e). The computing system 1200 can include multiple wireless network interfaces such as a combination of Wi-Fi, Bluetooth®, near field communication (NFC), and/or cellular telephony interfaces. The network interface(s) 1280 may also include, for example, a wired network interface to communicate with remote devices via network cable 1287, which may be, for example, an Ethernet cable, a coaxial cable, a fiber optic cable, a serial cable, or a parallel cable.

In one embodiment, the network interface(s) 1280 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1280 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1200 can further include one or more energy sources 1205 and one or more energy measurement systems 1245. Energy sources 1205 can include an AC/DC adapter coupled to an external power source, one or more batteries, one or more charge storage devices, a USB charger, or other energy source. Energy measurement systems include at least one voltage or amperage measuring device that can measure energy consumed by the computing system 1200 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the hardware can use an instruction set which may be an extension to an instruction set architecture for a particular type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

As described above, one aspect of the present technology is the gathering and use of data available from various specific and legitimate sources to enable crowdsource learning of sequential data. The present disclosure contemplates that in some instances, this gathered data may include personal information data that uniquely identifies or can be used to identify a specific person. Such personal information data can include demographic data, location-based data, online identifiers, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to learn new words, improve keyboard layouts, improve auto-correct engines for keyboards, and to enable an electronic device to better anticipate the needs of a user. Further, other uses for personal information data that benefit the user are also contemplated by the present disclosure. For instance, health and fitness data may be used, in accordance with the user's preferences, to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, crowdsourcing of sequences can be performed over a large number of users and is based on aggregated, non-personal information data. A large number of individual users can opt out of sending data to the sequence learning server and overall trends can still be detected.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide a technique to crowdsource labeling of training data for a machine learning model while maintaining the privacy of the data provided by crowdsourcing participants. Client devices can be used to generate proposed labels for a unit of data to be used in a training dataset. One or more privacy mechanisms are used to protect user data when transmitting the data to a server.

One embodiment provides for a data processing system comprising a memory device to store instructions and one or more processors to execute the instructions stored on the memory device. The instructions cause the data processing system to perform operations comprising sending an unlabeled set of data to a set of multiple mobile electronic devices, the set of multiple mobile electronic devices to generate a set of proposed labels for the unlabeled set of data, wherein each of the mobile electronic devices include a variant of a first machine learning model; receiving a set of proposed labels for the unlabeled set of data from the set of multiple mobile electronic devices, the set of proposed labels encoded to mask individual contributors of each proposed label in the set of proposed labels; processing the set of proposed labels to determine a most frequent proposed label for the unlabeled set of data; adding the unlabeled set of data and the most frequent proposed label to a first training set; and training a second machine learning model using the first training set, the second machine learning model on a server device.

One embodiment provides for a non-transitory machine readable medium storing instructions to cause one or more processors to perform operations comprising sending an unlabeled set of data to a set of multiple mobile electronic devices, the set of multiple mobile electronic devices to generate a set of proposed labels for the unlabeled set of data, wherein each of the mobile electronic devices include a first machine learning model; receiving a set of proposed labels for the unlabeled set of data from the set of multiple mobile electronic devices, the set of proposed labels encoded to mask individual contributors to the set of proposed labels; processing the set of proposed labels to determine an estimate of a most frequent proposed label for the unlabeled set of data; adding the unlabeled set of data and corresponding most frequent proposed labels to a first training set; and training a second machine learning model using the first training set, the second machine learning model on a server device.

One embodiment provides for a data processing system on a mobile electronic device, the data processing system comprising a memory device to store instructions and one or more processors to execute the instructions stored on the memory device. The instructions cause the one or more processors to select a set of data on the mobile electronic device; generate a training set based on selected data; train a first machine learning model using the training set; receive an unlabeled set of data from a server; generate proposed labels for elements of the unlabeled set of data; and transmit a privatized version of one or more proposed labels to the server.

One embodiment provides for a non-transitory machine readable medium storing instructions to cause one or more processors to perform operations comprising selecting a set of data on a mobile electronic device; generating a training set based on selected data; training a first machine learning model using the training set, the first machine learning model trained on the mobile electronic device; receiving an unlabeled set of data from a server; generating proposed labels for elements of the unlabeled set of data; and transmitting a privatized version of a proposed label to the server.

One embodiment provides for a data processing system comprising a memory device to store instructions and one or more processors to execute the instructions stored on the memory device. The instructions cause the data processing system to perform operations comprising sending an unlabeled set of data to a set of multiple mobile electronic devices, the set of multiple mobile electronic devices to generate a set of proposed labels for the unlabeled set of data, wherein each of the mobile electronic devices include a variant of a first machine learning model; receiving a set of proposed labels for the unlabeled set of data from the set of multiple mobile electronic devices, the set of proposed labels encoded to mask individual contributors of each proposed label in the set of proposed labels; processing the set of proposed labels to determine a most frequent proposed label for the unlabeled set of data; adding the unlabeled set of data and the most frequent proposed label to a first training set; and training a second machine learning model using the first training set, the second machine learning model on a server device.

One embodiment provides for a non-transitory machine readable medium storing instructions to cause one or more processors to perform operations comprising sending an unlabeled set of data to a set of multiple mobile electronic devices, the set of multiple mobile electronic devices to generate a set of proposed labels for the unlabeled set of data, wherein each of the mobile electronic devices include a first machine learning model; receiving a set of proposed labels for the unlabeled set of data from the set of multiple mobile electronic devices, the set of proposed labels encoded to mask individual contributors to the set of proposed labels; processing the set of proposed labels to determine an estimate of a most frequent proposed label for the unlabeled set of data; adding the unlabeled set of data and corresponding most frequent proposed labels to a first training set; and training a second machine learning model using the first training set, the second machine learning model on a server device.

One embodiment provides for a data processing system on a mobile electronic device, the data processing system comprising a memory device to store instructions and one or more processors to execute the instructions stored on the memory device. The instructions cause the one or more processors to select a set of data on the mobile electronic device; generate a training set based on selected data; train a first machine learning model using the training set; receive an unlabeled set of data from a server; generate proposed labels for elements of the unlabeled set of data; and transmit a privatized version of one or more proposed labels to the server.

One embodiment provides for a non-transitory machine readable medium storing instructions to cause one or more processors to perform operations comprising selecting a set of data on a mobile electronic device; generating a training set based on selected data; training a first machine learning model using the training set, the first machine learning model trained on the mobile electronic device; receiving an unlabeled set of data from a server; generating proposed labels for elements of the unlabeled set of data; and transmitting a privatized version of a proposed label to the server.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method comprising:
receiving, by an electronic device, an unlabeled set of data from a server;
generating, by the electronic device and using a trained machine learning model, proposed labels for elements of the unlabeled set of data; and
transmitting, by the electronic device, a privatized version of one of the proposed labels to the server.

2. The method of claim 1, further comprising:
generating, by the electronic device, the privatized version of the one of the proposed labels via a privacy-preserving encoding.

3. The method of claim 1, wherein the unlabeled set of data includes one or more of text data, image data, application activity data, and device activity data.

4. The method of claim 1, wherein the trained machine learning model is configured as a convolutional neural network.

5. The method of claim 1, wherein the trained machine learning model is configured as a recurrent neural network.

6. The method of claim 1, wherein the proposed labels are encoded to mask individual contributors via a privacy-preserving encoding algorithm.

7. The method of claim 6, wherein the privacy-preserving encoding algorithm is a differential privacy algorithm.

8. The method of claim 1, further comprising:
processing the proposed labels to determine an estimate of a most frequent proposed label for the unlabeled set of data by generating a sketch matrix of received proposed labels to aggregate proposed label data.

9. The method of claim 1, further comprising:
processing the proposed labels to determine an estimate of a most frequent proposed label for the unlabeled set of data by generating a histogram of received proposed labels to aggregate proposed label data.

10. A device comprising:
a memory; and
at least one processor configured to:
receive an unlabeled set of data from a server;
generate, using a trained machine learning model, proposed labels for elements of the unlabeled set of data; and
transmit a privatized version of one of the proposed labels to the server.

11. The device of claim 10, wherein the at least one processor is further configured to:
generate the privatized version of the one of the proposed labels via a privacy-preserving encoding.

12. The device of claim 10, wherein the unlabeled set of data includes one or more of text data, image data, application activity data, and device activity data.

13. The device of claim 10, wherein the trained machine learning model is configured as at least one of a convolutional neural network or a recurrent neural network.

14. The device of claim 10, wherein the proposed labels are encoded to mask individual contributors via a privacy-preserving encoding algorithm.

15. The device of claim 14, wherein the privacy-preserving encoding algorithm is a differential privacy algorithm.

16. A non-transitory machine-readable medium comprising instructions that, when executed by one or more processors, cause the one or more processors to perform operations comprising:
receiving, by an electronic device, an unlabeled set of data from a server;
generating, by the electronic device and using a trained machine learning model, proposed labels for elements of the unlabeled set of data; and transmitting, by the electronic device, a privatized version of one of the proposed labels to the server.

17. The non-transitory machine-readable medium of claim 16, wherein the operations further comprise:
generating, by the electronic device, the privatized version of the one of the proposed labels via a privacy-preserving encoding.

18. The non-transitory machine-readable medium of claim 16, wherein the unlabeled set of data includes one or more of text data, image data, application activity data, and device activity data.

19. The non-transitory machine-readable medium of claim 16, wherein the trained machine learning model is configured as a convolutional neural network.

20. The non-transitory machine-readable medium of claim 16, wherein the proposed labels are encoded to mask individual contributors via a privacy-preserving encoding algorithm.

* * * * *